US011474312B2

(12) United States Patent
Nguyen

(10) Patent No.: US 11,474,312 B2
(45) Date of Patent: Oct. 18, 2022

(54) OPTOELECTRONIC MODULE FOR RECEIVING MULTIPLE OPTICAL CONNECTORS

(71) Applicant: FINISAR CORPORATION, Sunnyvale, CA (US)

(72) Inventor: Long Van Nguyen, San Jose, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 16/805,386

(22) Filed: Feb. 28, 2020

(65) Prior Publication Data

US 2021/0271036 A1    Sep. 2, 2021

(51) Int. Cl.
*H04B 10/00* (2013.01)
*G02B 6/42* (2006.01)
*G02B 6/43* (2006.01)

(52) U.S. Cl.
CPC ........... *G02B 6/4246* (2013.01); *G02B 6/426* (2013.01); *G02B 6/428* (2013.01); *G02B 6/4277* (2013.01); *G02B 6/43* (2013.01)

(58) Field of Classification Search
CPC combination set(s) only.
See application file for complete search history.

(56) References Cited

U.S. PATENT DOCUMENTS

| 4,993,803 A * | 2/1991 | Suverison | G02B 6/3817 250/227.11 |
|---|---|---|---|
| 5,140,663 A * | 8/1992 | Edwards | G02B 6/3869 385/139 |
| 5,515,468 A * | 5/1996 | DeAndrea | G02B 6/4201 385/88 |
| 6,074,228 A * | 6/2000 | Berg | H01R 12/57 385/75 |
| 7,116,912 B2 * | 10/2006 | Pang | G02B 6/4201 398/139 |
| 7,215,554 B2 * | 5/2007 | Torres | H01R 13/6582 361/747 |
| 7,215,883 B1 * | 5/2007 | Lewis | H04B 10/077 398/17 |
| 7,508,677 B2 * | 3/2009 | Ice | G02B 6/4277 361/752 |
| 7,534,052 B2 * | 5/2009 | Fujiwara | G02B 6/4292 385/88 |

(Continued)

*Primary Examiner* — Agustin Bello
(74) *Attorney, Agent, or Firm* — Blank Rome LLP

(57) ABSTRACT

An example optoelectronic module includes a housing that extends between a first end and an opposite second end. The optoelectronic module includes a printed circuit board ("PCB") with an electrical connector at an end thereof, a transmitter electrically coupled to the PCB, a receiver electrically coupled to the PCB, and a receiving member including a plurality of ports each configured to receive a respective one of a plurality of fiber optic cables. In one aspect, the receiving member includes a plurality of deformable retaining members configured to be positioned in corresponding receptacles of the housing member in an arrangement structured to limit movement of the receiving member. In another aspect, the module also includes a plurality of fiber optic cable receptacles and a receptacle retaining member is positioned between the housing and the receptacles and limits movement of the receptacles in the housing.

22 Claims, 27 Drawing Sheets

(56) References Cited

U.S. PATENT DOCUMENTS

| | | | | |
|---|---|---|---|---|
| RE44,664 E | * | 12/2013 | McColloch | G02B 6/4249 385/89 |
| 8,936,403 B2 | * | 1/2015 | Howard | G02B 6/4212 385/89 |
| 8,977,088 B2 | * | 3/2015 | Castagna | G02B 6/4206 385/49 |
| 9,128,257 B2 | * | 9/2015 | Otte | G02B 6/4256 |
| 9,134,489 B2 | * | 9/2015 | Zbinden | G02B 6/4214 |
| 9,383,529 B1 | * | 7/2016 | Yashar et al. | G02B 6/423 |
| 9,918,416 B2 | * | 3/2018 | Mao | G02B 6/4277 |
| 10,466,427 B2 | * | 11/2019 | Wang et al. | G02B 6/4214 |
| 2002/0110336 A1 | * | 8/2002 | Dair et al. | G02B 6/4256 385/92 |
| 2002/0110338 A1 | * | 8/2002 | Dair | G02B 6/4246 385/92 |
| 2002/0159712 A1 | * | 10/2002 | Holmquist | G02B 6/3878 385/70 |
| 2003/0020998 A1 | * | 1/2003 | Kuczynski | G02B 6/4253 359/245 |
| 2005/0148223 A1 | * | 7/2005 | Shirk et al. | G02B 6/4246 439/160 |
| 2006/0178057 A1 | * | 8/2006 | Lloyd | G02B 6/4292 439/701 |
| 2009/0010600 A1 | * | 1/2009 | Kim et al. | G02B 6/4246 385/90 |
| 2011/0051373 A1 | * | 3/2011 | McColloch | G02B 6/4246 361/709 |
| 2013/0210269 A1 | * | 8/2013 | Neer | H05K 7/20145 439/487 |
| 2014/0010514 A1 | * | 1/2014 | McColloch | G02B 6/4261 385/136 |
| 2014/0153192 A1 | * | 6/2014 | Neer | H05K 9/0058 361/704 |
| 2014/0196943 A1 | * | 7/2014 | Hirschy | G02B 6/4246 174/382 |
| 2014/0219615 A1 | * | 8/2014 | Petersen et al. | G02B 6/3817 385/88 |
| 2016/0077287 A1 | * | 3/2016 | Isenhour et al. | G02B 6/32 385/76 |
| 2017/0196097 A1 | * | 7/2017 | Barwicz | H01L 21/4853 |
| 2017/0254973 A1 | * | 9/2017 | Yu | G02B 6/4244 |
| 2018/0113261 A1 | * | 4/2018 | Han | G02B 6/4215 |
| 2018/0172942 A1 | * | 6/2018 | Bauco | G02B 6/0006 |
| 2018/0210156 A1 | * | 7/2018 | Lin et al. | G02B 6/4215 |
| 2018/0368283 A1 | * | 12/2018 | Little | H05K 7/20336 |
| 2019/0090370 A1 | * | 3/2019 | Luo et al. | G02B 6/4292 |
| 2019/0346637 A1 | * | 11/2019 | Schwerzig | G02B 6/4292 |
| 2020/0049912 A1 | * | 2/2020 | Lu | H05K 9/0058 |
| 2020/0363595 A1 | * | 11/2020 | Grann | G02B 6/4214 |

* cited by examiner

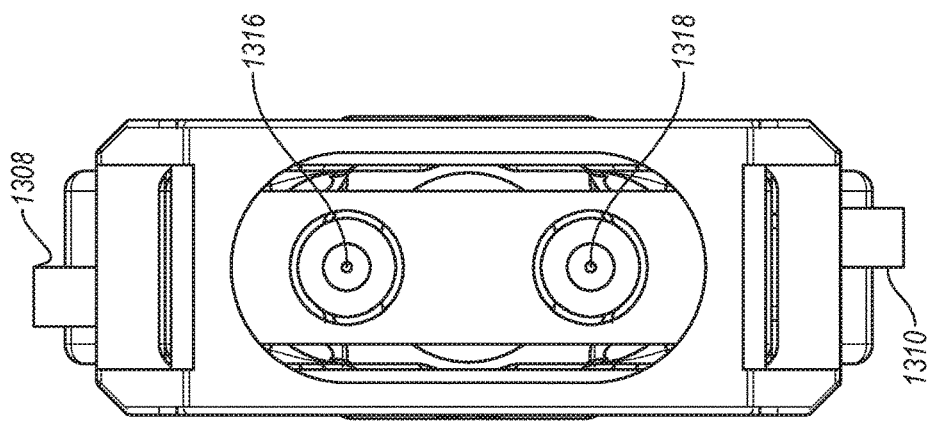
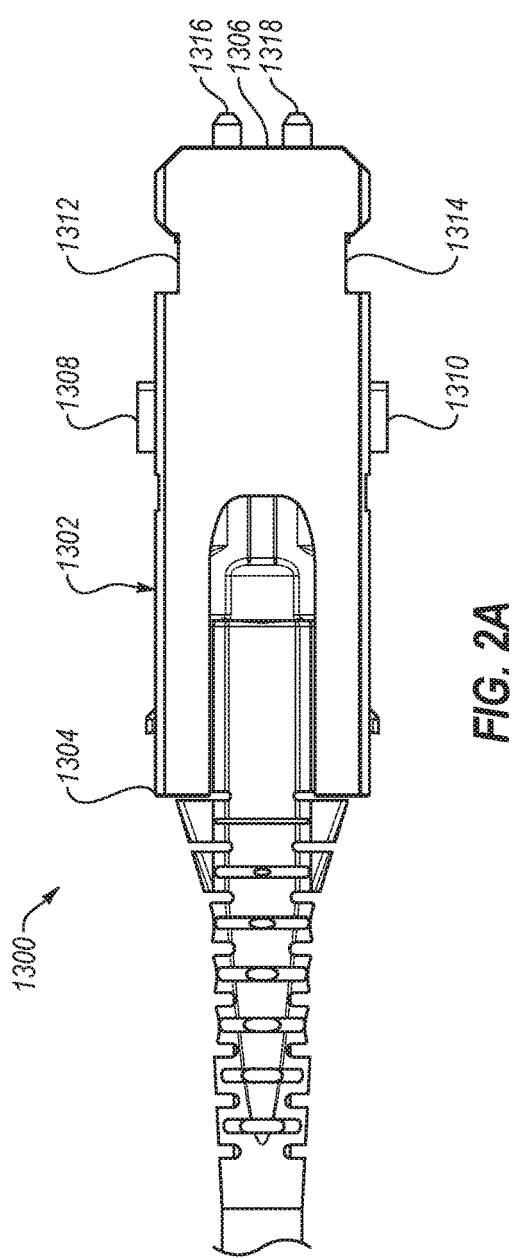
FIG. 2B
FIG. 2A

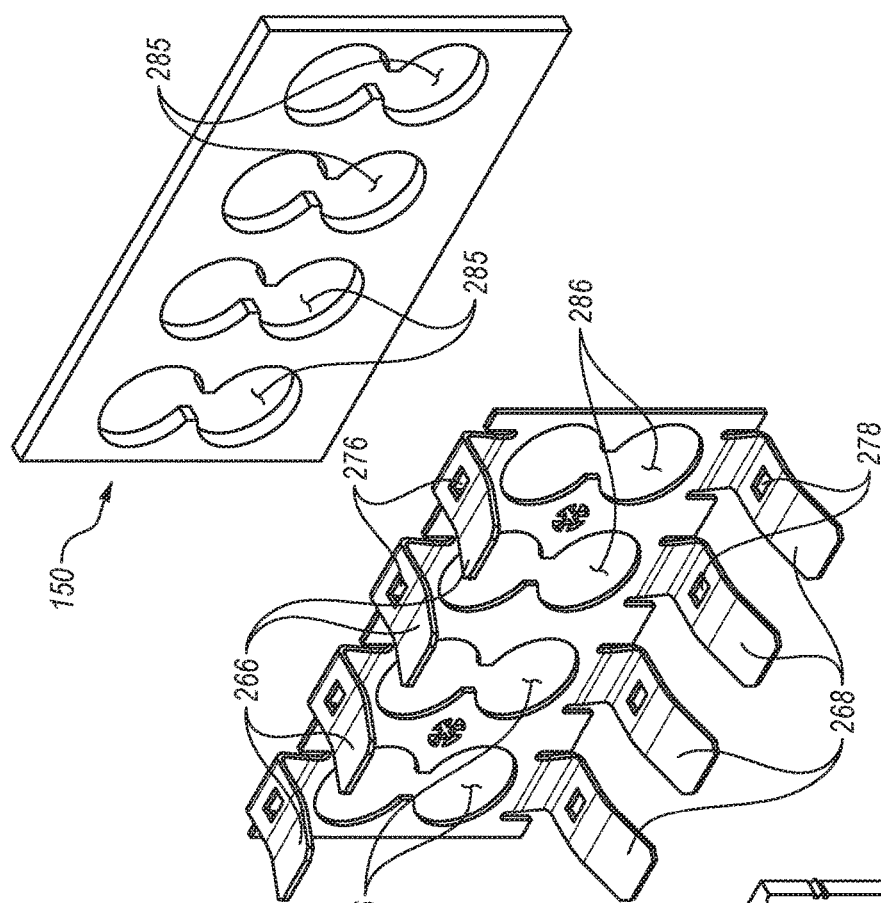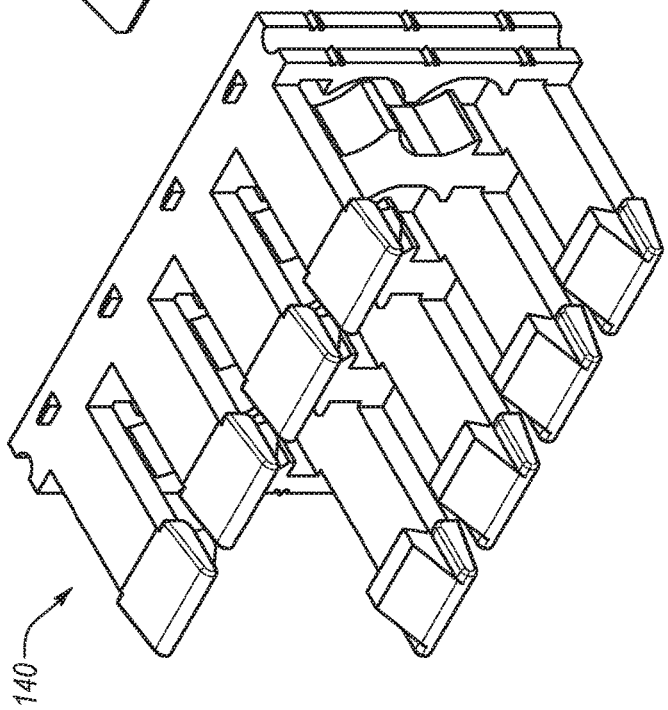
FIG. 11

OPTOELECTRONIC MODULE FOR RECEIVING MULTIPLE OPTICAL CONNECTORS

BACKGROUND

The present disclosure generally relates to optoelectronic modules. More particularly, but not exclusively, the present disclosure relates to optoelectronic modules configured to receive multiple optical connectors.

Communication modules, such as optoelectronic modules, may include various components that engage in the transmission and reception of optical signals. Some of the components may be housed within a shell of the optical module. Examples of such components may include a transmitter optical subassembly (TOSA) or a receiver optical subassembly (ROSA). The optoelectronic module itself is operably received within a host device that serves as one component of a communications network.

To engage in optical communication with other communications modules, the optoelectronic module may operably connect with a connectorized fiber optic cable which includes one or more optical fibers. The optoelectronic module may include a transmit port or a receive port configured to receive the connector of the optical fiber. Optical signals may be received or transmitted by the optoelectronic module via the optical fiber. Optical signals received by the optoelectronic module may be converted to electrical signals. Conversely, the optoelectronic module may convert electrical signals to optical signals for transmission.

In certain applications, an optoelectronic module which is operably connectable with a plurality of fiber optic cables may be desired. For example, an optoelectronic module which is operably connectable with a plurality of fiber optic cables may be suitable for use when a plurality of fiber optic cables are connected to a single optoelectronic transceiver which, in turn, is operably received within a host device.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one embodiment, an optoelectronic module includes a housing extending along a longitudinal axis between a first end and an opposite second end. The first end of the housing is configured to interface with a plurality of fiber optic cables including one or more optical fibers. The module also includes a printed circuit board ("PCB") positioned within the housing, a transmitter positioned inside of the housing and electrically coupled to the PCB, and a receiver positioned inside of the housing and electrically coupled to the PCB. The module further includes a receiving member including a plurality of ports each configured to receive a respective one of the plurality of the fiber optic cables. The receiving member also includes a plurality of deformable retaining members configured to be positioned in corresponding receptacles of the housing member in an arrangement structured to limit movement of the receiving member along the longitudinal axis.

In another embodiment, an optoelectronic module includes a housing extending along a longitudinal axis between a first end and an opposite second end. The first end of the housing is configured to interface with a plurality of fiber optic cables including one or more optical fibers. The module also includes a PCB positioned within the housing, a transmitter positioned inside of the housing and electrically coupled to the PCB, and a receiver positioned inside of the housing and electrically coupled to the PCB. The module also includes a receiving member including a plurality of ports each configured to receive a respective one of the plurality of the fiber optic cables. A number of retaining members are positioned between and engage with the receiving member and the housing in an arrangement preventing movement of the receiving member along the longitudinal axis relative to the housing.

In still another embodiment, an optoelectronic module includes a housing extending along a longitudinal axis between a first end and an opposite second end. The first end of the housing is configured to interface with a plurality of fiber optic cables including one or more optical fibers. The module also includes a PCB positioned within the housing, a transmitter positioned inside of the housing and electrically coupled to the PCB, and a receiver positioned inside of the housing and electrically coupled to the PCB. The module also includes a receiving member including a plurality of ports each configured to receive a respective one of the plurality of the fiber optic cables, and a plurality of receptacles each structured to receive a portion of a respective one of the plurality of fiber optic cables. A receptacle retaining member is positioned between the housing and the receptacles, and the receptacle retaining member engages against a number of the receptacles to limit movement of the receptacles in the housing.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 2A and 2B are side and end views, respectively, of the connector of the fiber optic cable illustrated in FIG. 1;

FIG. 11 is an exploded view of a receiving member and biasing member of the optoelectronic module illustrated in FIG. 1;

DETAILED DESCRIPTION

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to optoelectronic modules. In particular, some embodiments relate to optoelectronic modules configured to receive and engage with a plurality of fiber optic cables each having its own connector. Although various embodiments are described in the context of optoelectronic modules used in the field of optical networking, the embodiments disclosed herein may be employed in other fields or operating environments where the functionality disclosed herein may be useful. Accordingly, the scope of the invention should not be construed to be limited to the example implementations and operating environments disclosed herein.

Figure 1:
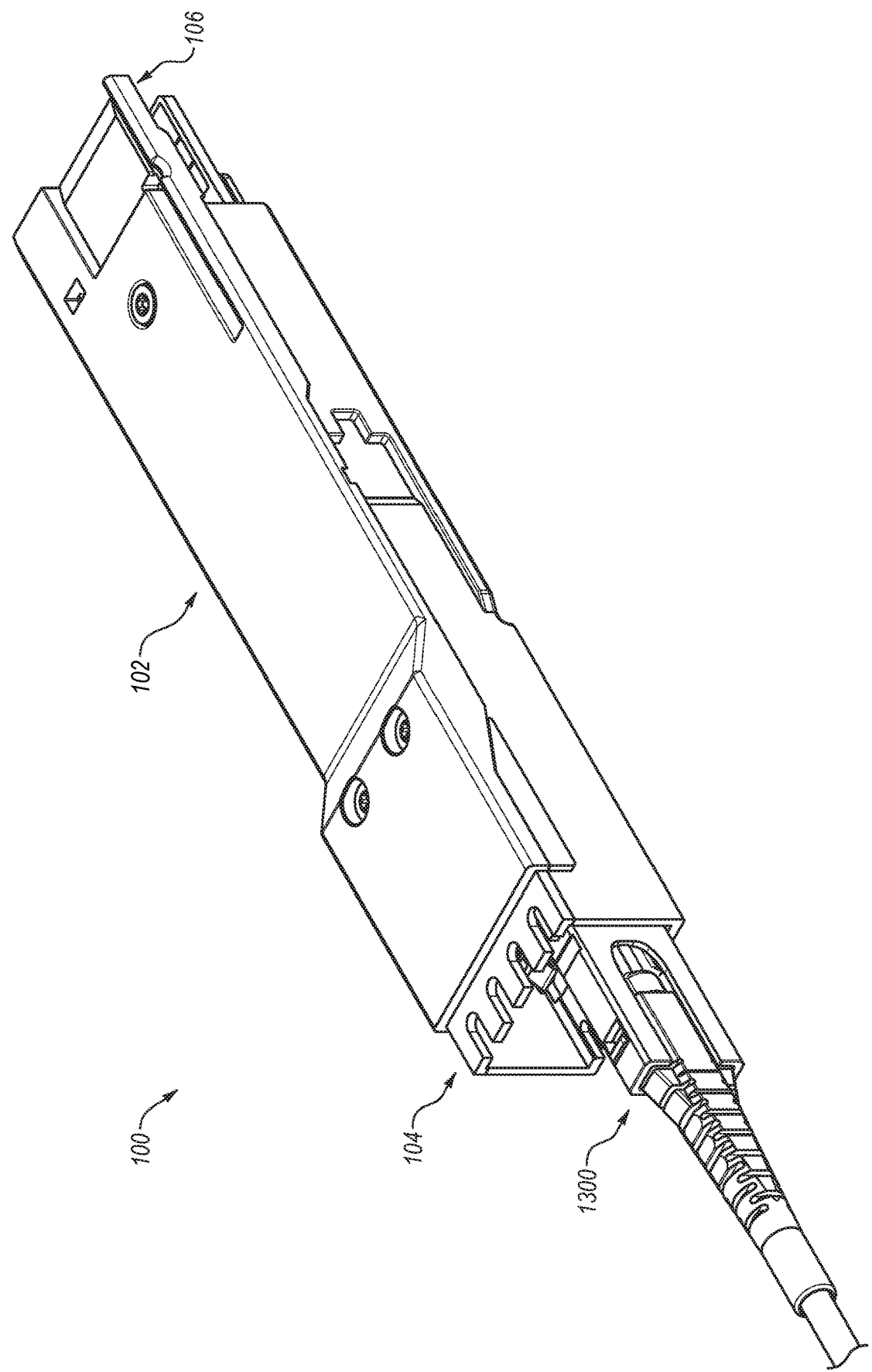
FIG. 1 is a perspective view of an optoelectronic module operably connected with a fiber optic cable.
Figure 3:
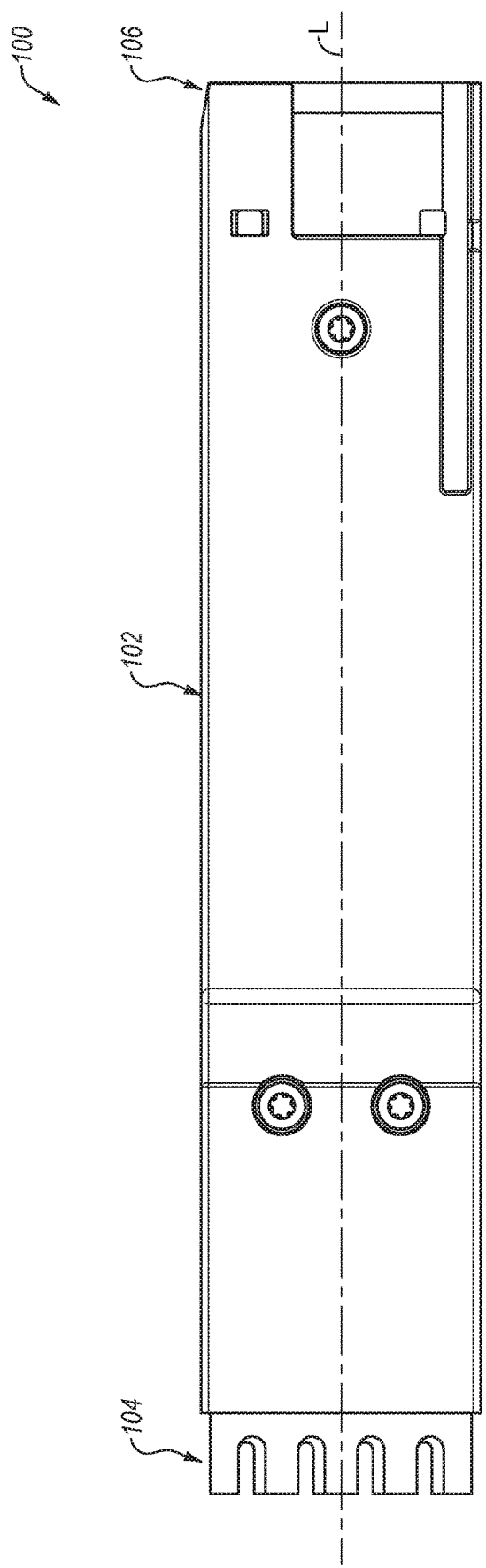
FIG. 3 is a top, plan view of the optoelectronic module of FIG. 1.
Figure 4:
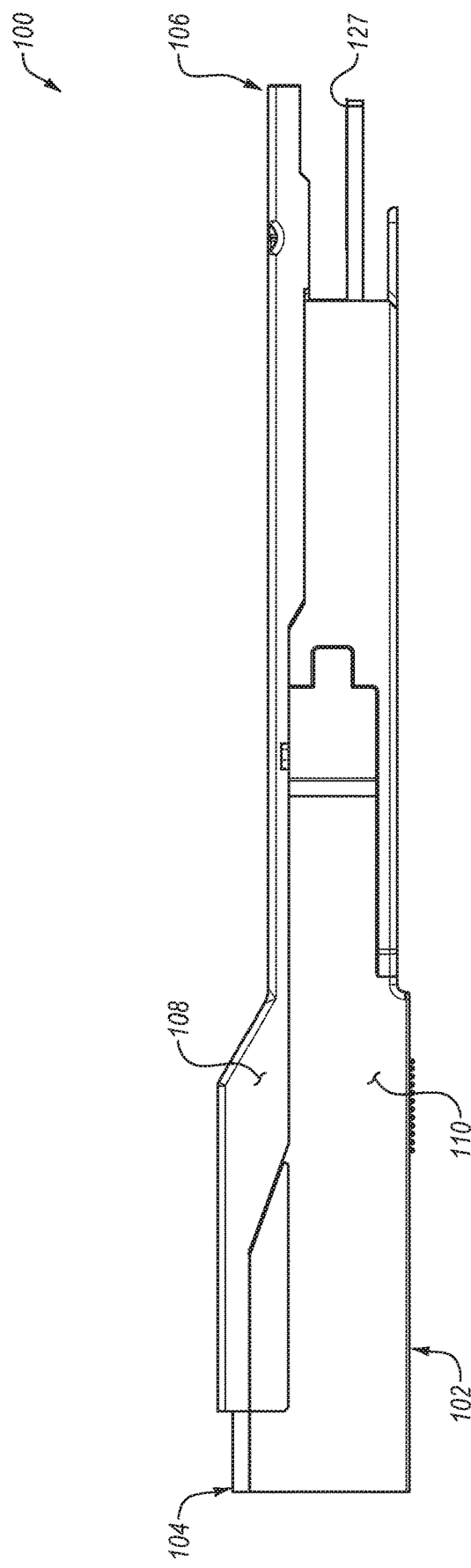
FIG. 4 is a side view of the optoelectronic module of FIG. 1.

Referring now generally to FIGS. 1, 3 and 4, there is illustrated an example embodiment of an optoelectronic module 100. As illustrated, optoelectronic module 100 includes a housing 102 that extends along a longitudinal axis L of optoelectronic module 100 between a first end 104 and a second end 106 of optoelectronic module 100. Housing 102 includes a first portion 108 and a second portion 110 which are configured to engage with one another in order to house a number of components of optoelectronic module 100. First end 104 of optoelectronic module 100 is configured to interface with a fiber optic cable 1300 including one or more optical fibers. Similarly, in the illustrated configuration, fiber optic cable 1300 is releasably connected to first end 104 and extends in line with longitudinal axis L. In the illustrated form where fiber optic cable 1300 is releasably connected to optoelectronic module 100, optoelectronic module 100 may function as a stand-alone module. However, optoelectronic module 100 may be permanently attached to fiber optic cable 1300, and thus optoelectronic module 100 represents one end of an "active cable" which may include another optoelectronic module permanently attached to the other end of fiber optic cable 1300. In some embodiments, fiber optic cable 1300 is a multichannel fiber-optic communication cable that includes two fibers, one of which is employed to transfer data signals in one direction, and the other of which is employed to transfer data signals in the opposite direction.

While only a single fiber optic cable 1300 is releasably connected with optoelectronic module 100 in the form illustrated in FIG. 1, up to four separate fiber optic cables 1300 may be releasably connected with optoelectronic module 100. Embodiments of optoelectronic module 100 where it may be releasably connected to more than four, or less than four, separate fiber optic cables 1300 are contemplated. Optoelectronic module 100 may also be used with less than the total maximum possible number of fiber optic cables 1300 connected therewith. For example, optoelectronic module 100 could be used with one, two or three fiber optic cables 1300 connected thereto.

Further details of fiber optic cable 1300 are illustrated in FIGS. 2A and 2B. More specifically, fiber optic cable 1300 includes a connector 1302 configured to be at least partially positioned in first end 104 of housing 102 of optoelectronic module 100. Connector 1302 extends between a first end 1304 and a second end 1306 and includes a pair of oppositely positioned tabs 1308 and 1310 which, as best seen in FIG. 2B, are offset from one another. Tabs 1308 and 1310 are configured to be received in corresponding slots on housing 102 in order to guide engagement of connector 1302 with optoelectronic module 100, further details of which will be provided below. Connector 1302 also includes a pair of oppositely positioned receptacles 1312 and 1314 positioned between tabs 1308 and 1310 and second end 1306. Receptacles 1312 and 1314 are configured to receive a portion of optoelectronic module 100 in order to releasably connect fiber optic cable 1300 with optoelectronic module 100. Further details of this arrangement will also be discussed below. Connector 1302 further includes a pair of ferrules 1316, 1318 which extend beyond second end 1306 and are configured to be received in a corresponding receptacle of optoelectronic module 100.

Optoelectronic module 100 may be configured for optical signal transmission and reception at a variety of per-second data rates including, but not limited to, 150 gigabits per second (Gb/s) or higher. In addition, although the example optoelectronic module 100 is configured to be substantially compliant with the CXP multisource agreement (MSA), optoelectronic module 100 can instead be configured to assume a variety of different form factors that are substantially compliant with various transceiver or transponder MSAs including, but not limited to, C form-factor pluggable (CFP), small form factor (SFF), small form-factor pluggable (SFP), 10 Gigabit small form factor pluggable (XFP), XPAK, X2, XENPAK, or quad small form-factor pluggable (QSFP).

Optoelectronic module 100 may be designed to be plugged into a larger electronic system such as a PCB of a host device or the like. For example, optoelectronic module 100 may include a latching mechanism with a handle that may be operated to fasten or release optoelectronic module 100 with respect to other components. In some configurations, the latching mechanism may include a slider operably connected to a cam and configured to cause the cam to rotate about an axis of rotation to displace an end of a latch to disengage the latch from a host receptacle. Once mounted to a host PCB, optoelectronic module 100 may be configured to communicate data between the host device and a network, for example.

Figure 5:
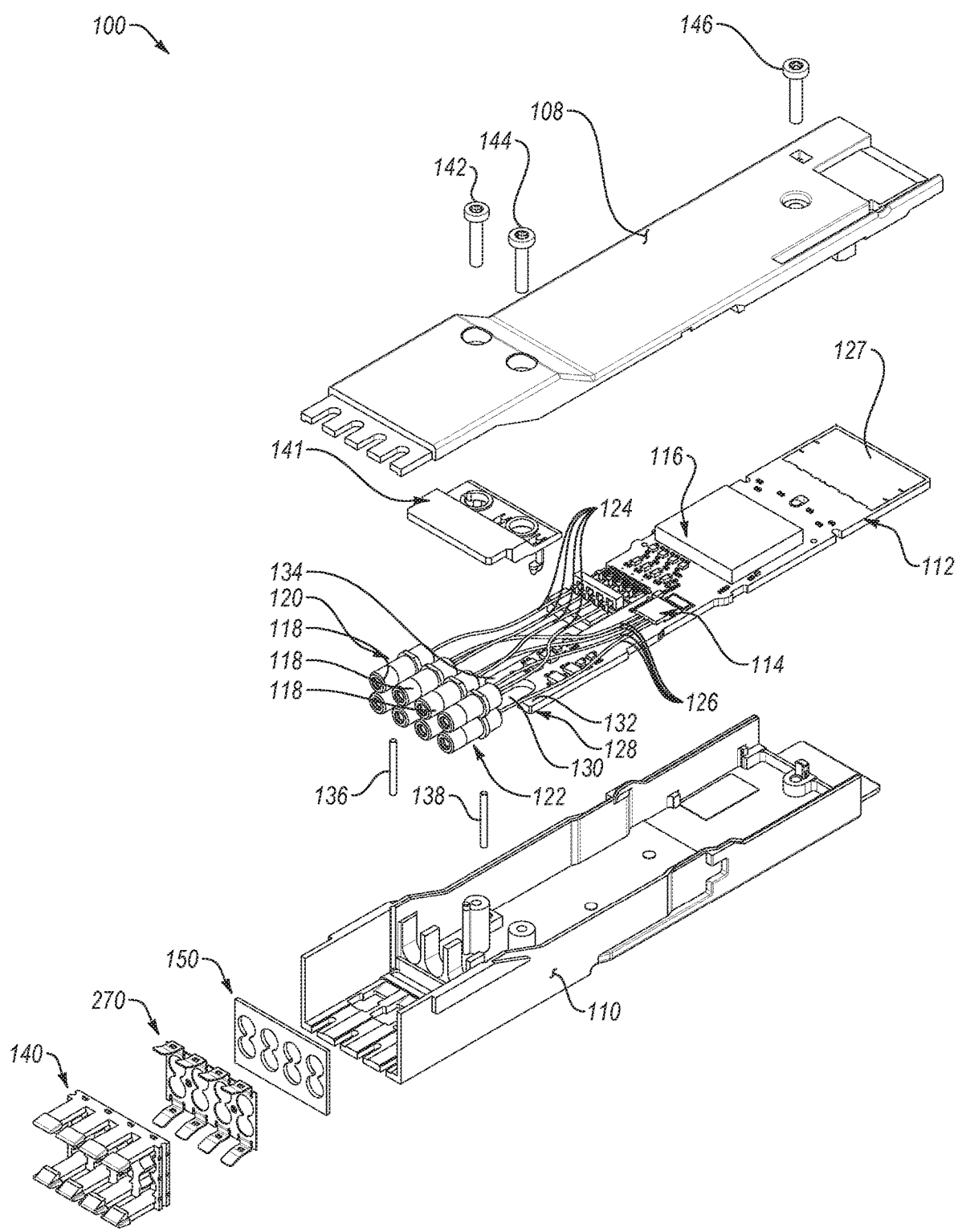
FIG. 5 is a perspective, exploded view of the optoelectronic module of FIG. 1.

FIG. 5 is an exploded view of optoelectronic module 100. As illustrated in FIG. 5, in addition to housing 102 which includes first portion 108 and second portion 110, optoelectronic module 100 also includes a PCB 112, a TOSA 114, a ROSA 116, and a plurality of receptacles 118 (only a few of which have been identified to preserve clarity) forming an array of receptacles having a first row 120 of receptacles 118 positioned over a second row 122 of receptacles 118. In the illustrated form, receptacles 118 of first row 120 are optically coupled with ROSA 116 via optical fibers 124, and receptacles 118 of row 122 are optically coupled with TOSA 114 via optical fibers 126. Alternative forms for optically coupling TOSA 114 and ROSA 116 with receptacles 118 are also possible. TOSA 114 may include an array of transmitters and ROSA 116 may include an array of receivers. In this example, where each receptacle 118 includes an optical fiber and there are eight (8) receptacles 118, TOSA 114 includes an array with four (4) transmitters, and ROSA 116 includes an array with four (4) receivers.

Optoelectronic module 100 may convert electrical signals to optical signals representing the electrical signals and vice versa. For example, data in the form of optical signals may be communicated from a network along fiber optic cable 1300 to optoelectronic module 100. ROSA 116 of optoelectronic module 100 may convert the optical signals to electrical signals representative of the optical signals. The electrical signals may then be communicated to the host device. Likewise, the host device may communicate electrical signals to optoelectronic module 100. TOSA 114 of optoelectronic module 100 may convert the electrical signals to optical signals representative of the electrical signals. The optical signals may be communicated along fiber optic cable 1300 into the network to, e.g., another optoelectronic module 100.

TOSA 114 or ROSA 116 may be electrically coupled to PCB 112 with an electrical connector such as a flex circuit or other suitable electrical connector.

PCB 124 may include an edge connector 127 that is configured to be coupled with other components, such as a host device. As best seen in FIG. 4 for example, edge connector 127 is positioned between first portion 108 and second portion 110 of housing 102 to provide access to edge connector 127 by the host device. Second end 106 of optoelectronic module 100 may be sized and shaped to interface with the host receptacle. In one form for example, optoelectronic module 100 may be positioned at least partially inside of the host receptacle and a latching mechanism, if present, may fasten or release optoelectronic module 100 with respect to the host receptacle.

With reference to FIG. 5, PCB 112 includes an end portion 128 positioned opposite of edge connector 127. End portion 128 includes an opening 130 which separates portions 132 and 134 of PCB 112. In the illustrated from, opening 130 has a substantially U-shaped configuration, although it may be alternatively shaped and configured in other forms.

Figure 12:
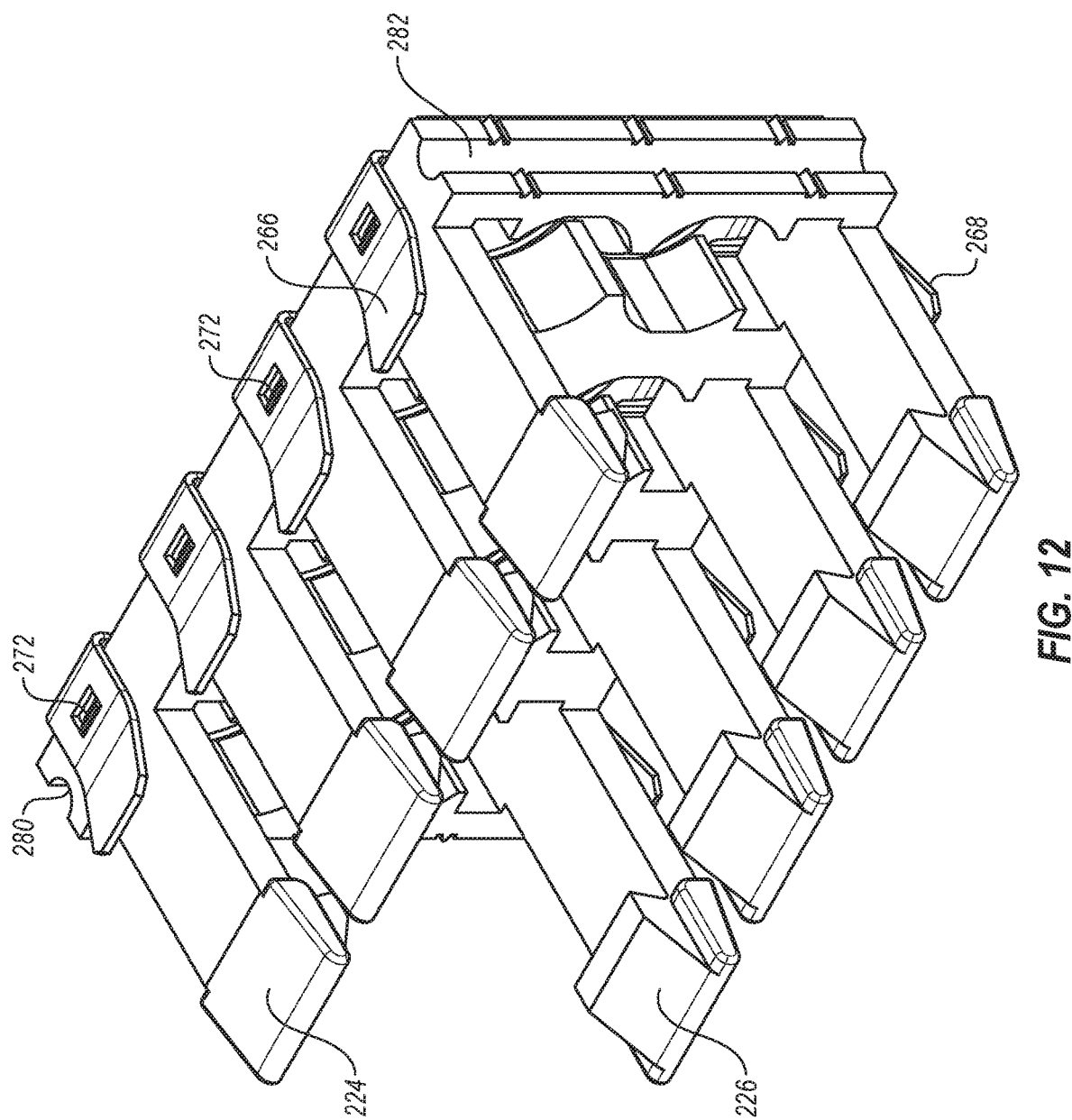
FIG. 12 is a perspective view of the receiving member illustrated in FIG. 11.
Figure 13:
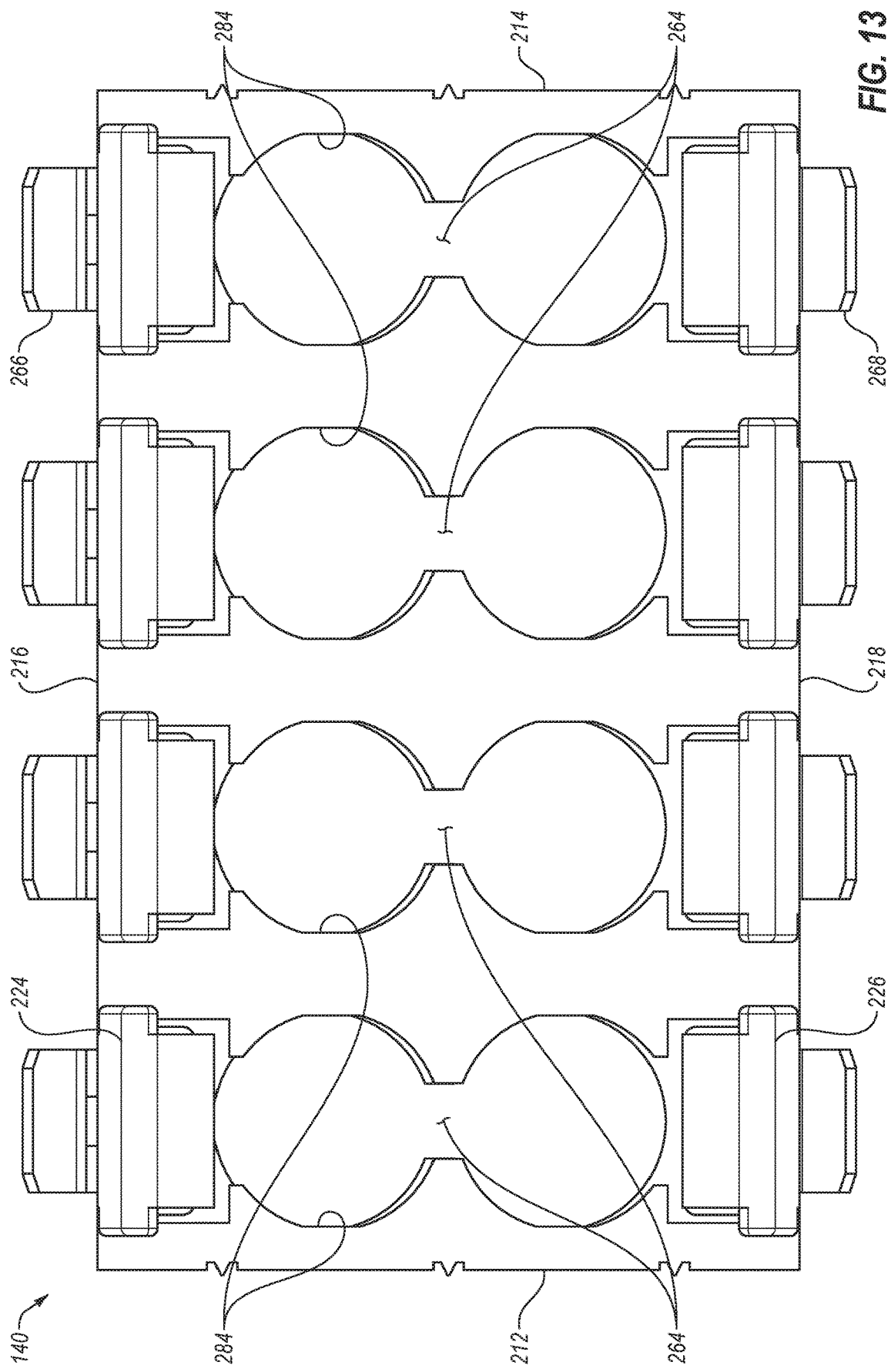
FIG. 13 is an end view of the receiving member illustrated in FIG. 11.

Optoelectronic module 100 also includes retaining members 136, 138, a receptacle retaining member 141, fasteners 142, 144, and 146, a receiving member 140 (including a plate 270 as illustrated in FIGS. 11 and 12 for example), and a biasing member 150. Further details of these and other components of optoelectronic module 100, as well as the interaction and relationship between the components of optoelectronic module 100 will be provided in connection with the illustrations of FIGS. 6-18.

Figure 6:
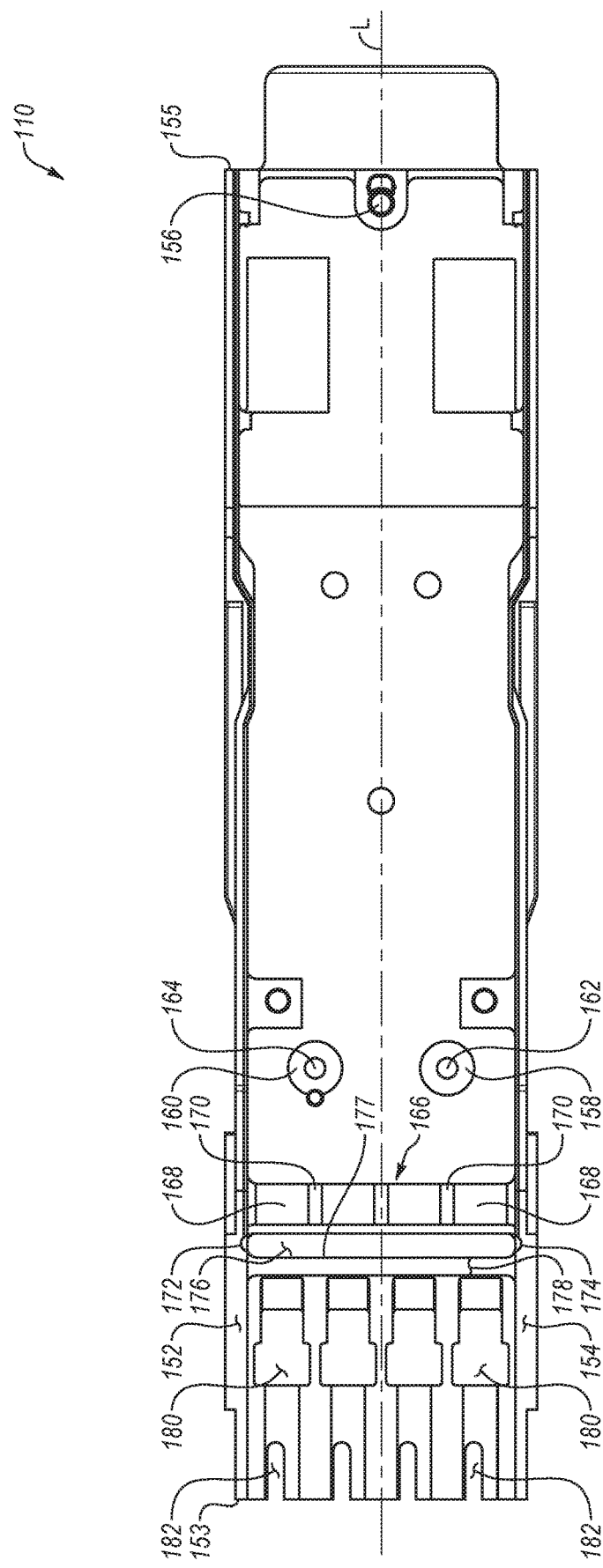
FIG. 6 is a top, plan view of a second portion of the housing of the optoelectronic module illustrated in FIG. 1.
Figure 7:
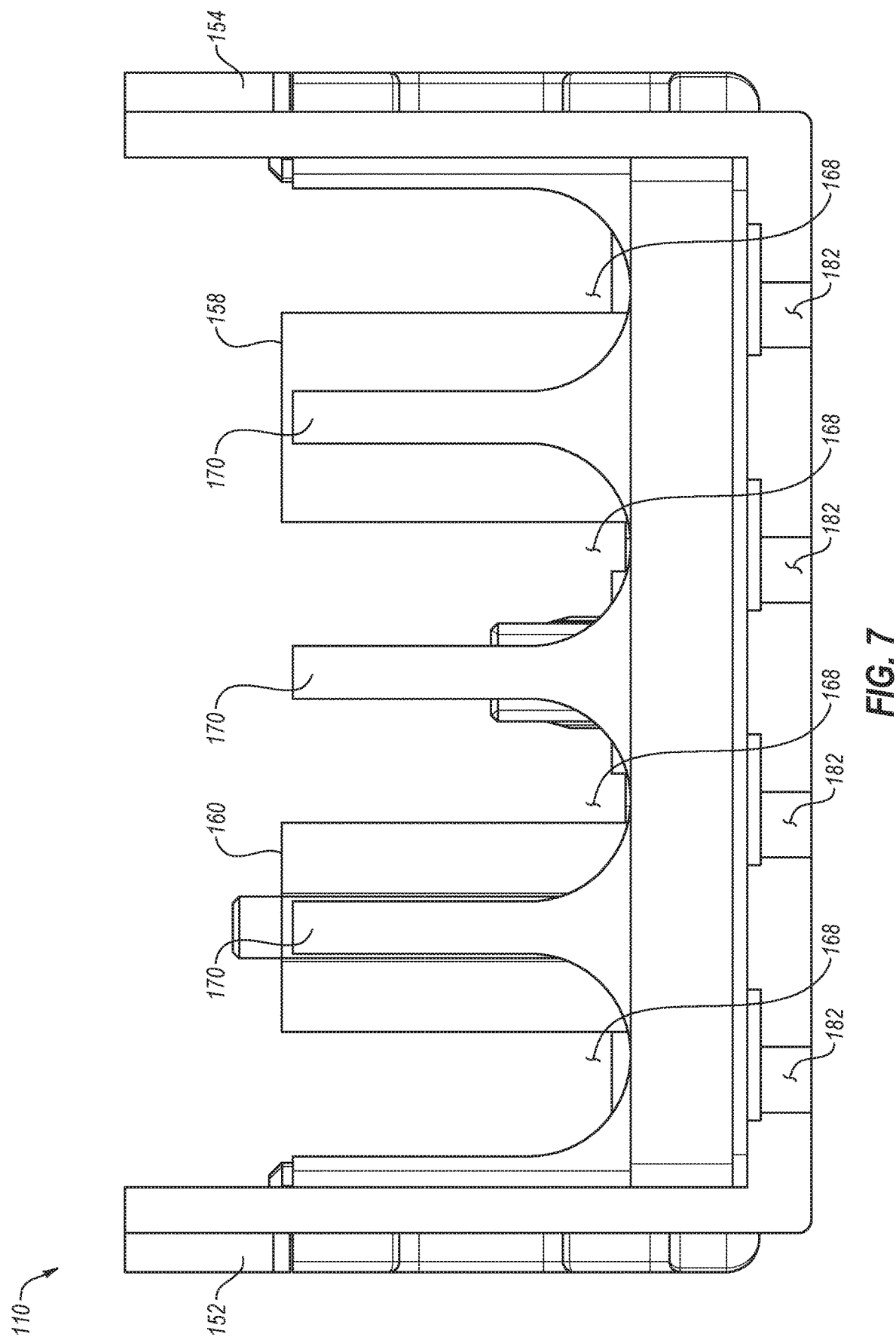
FIG. 7 is an end view of the second portion of the housing illustrated in FIG. 6.

In FIGS. 6 and 7, second portion 110 of housing 102 is shown in top and end views, respectively. Amongst other features shown, second portion 110 includes a sidewall 152 positioned opposite of a sidewall 154. Generally speaking, sidewalls 152 and 154 extend between and terminate at opposite ends 153 and 155 of second portion 110 such that, when coupled with first portion 108 of housing 102, first end 104 and second end 106 of housing 102 are at least partially open. Second portion 110 further includes aperture 156 structured to receive fastener 146. A pair of bosses 158 and 160 extend from second portion 110 toward first portion 108. Boss 158 includes an aperture 162 configured to receive fastener 144, and boss 160 includes an aperture 164 configured to receive fastener 142. In one non-limiting form, fasteners 142, 144 and 146 may be externally threaded and apertures 156, 162, and 164 may include a corresponding internal threading for providing a threaded engagement between fasteners 142, 144 and 146 and apertures 156, 162, and 164, although other configurations for connecting these components are possible.

A partition 166 is positioned between bosses 158 and 160 and first end 104. Partition 166 extends between sidewalls 152 and 154 and toward first portion 108 of housing 102. Partition 166 includes a number of openings 168 separated by dividing portions 170 of partition 166. Only a few of openings 168 and dividing portions 170 have been identified in FIG. 6 in order to preserve clarity. Each of openings 168 has a generally U-shaped configuration and is configured to receive one or more of receptacles 118 illustrated in FIG. 5. In the illustrated form, second portion 110 includes four (4) openings 168 which are separated by three (3) dividing portions 170 of partition 166. In this configuration, each of openings 168 can receive two (2) of the eight (8) receptacles 118 included in the representative embodiment. In alternative forms where optoelectronic module 100 includes more or less than eight (8) receptacles 118, partition 166 could be modified to include a different number of openings 168 for receiving the particular number of receptacles 118 present.

Second portion 110 also includes a recessed portion 172 positioned adjacent to partition 166 and formed in sidewall 152. Positioned opposite of recessed portion 172 is recessed portion 174 which is formed in sidewall 154 and positioned adjacent to partition 166. Recessed portions 172 and 174 extend transversely to longitudinal axis L and communicate with an elongated slot or groove 176 which extends between sidewall 152 and sidewall 154. A surface of elongated slot 176 is recessed relative to surface 178 of second portion 110 such that elongated slot 176 includes a step 177 extending between the surface of elongated slot 176 and surface 178. Surface 178 is positioned between elongated slot 176 and a number of openings 180 (only a few of which have been identified in FIG. 6 in order to preserve clarity) which extend through second portion 110. At end 153 of second portion 110, a plurality of elongated openings or slots 182 extend through second portion 110 and are configured to receive tab 1310 of connector 1302 of fiber optic cable 1300. While openings 182 have a substantially U-shaped configuration in the illustrated form, other shapes for openings 182 are contemplated.

Figure 8:
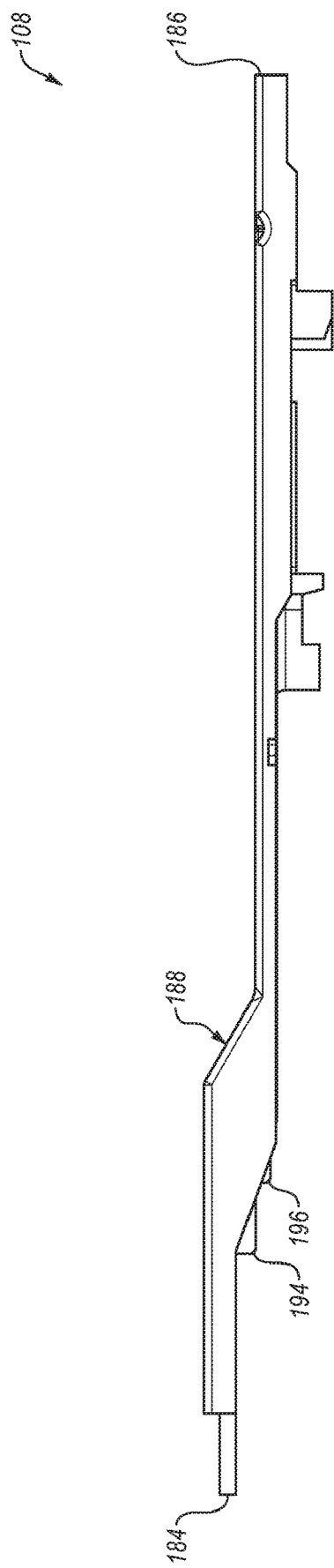
FIG. 8 is a side view of a first portion of the housing of the optoelectronic module illustrated in FIG. 1.
Figure 9:
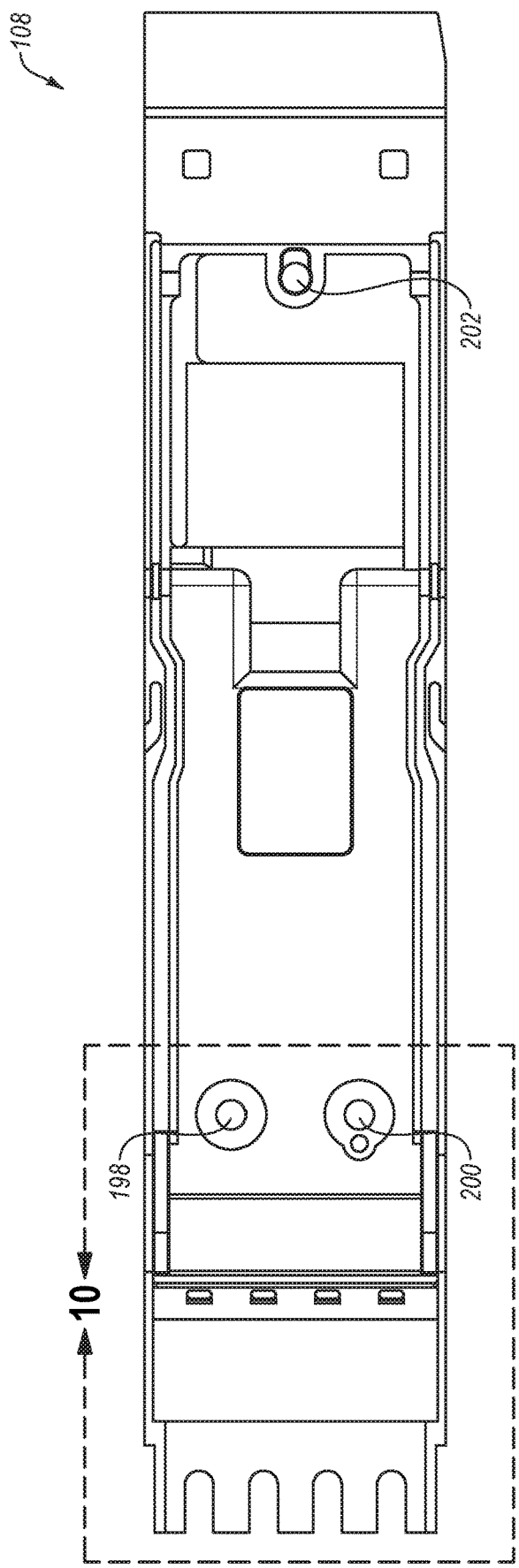
FIG. 9 is a plan view of the underside of the first portion of the housing illustrated in FIG. 8.
Figure 10:
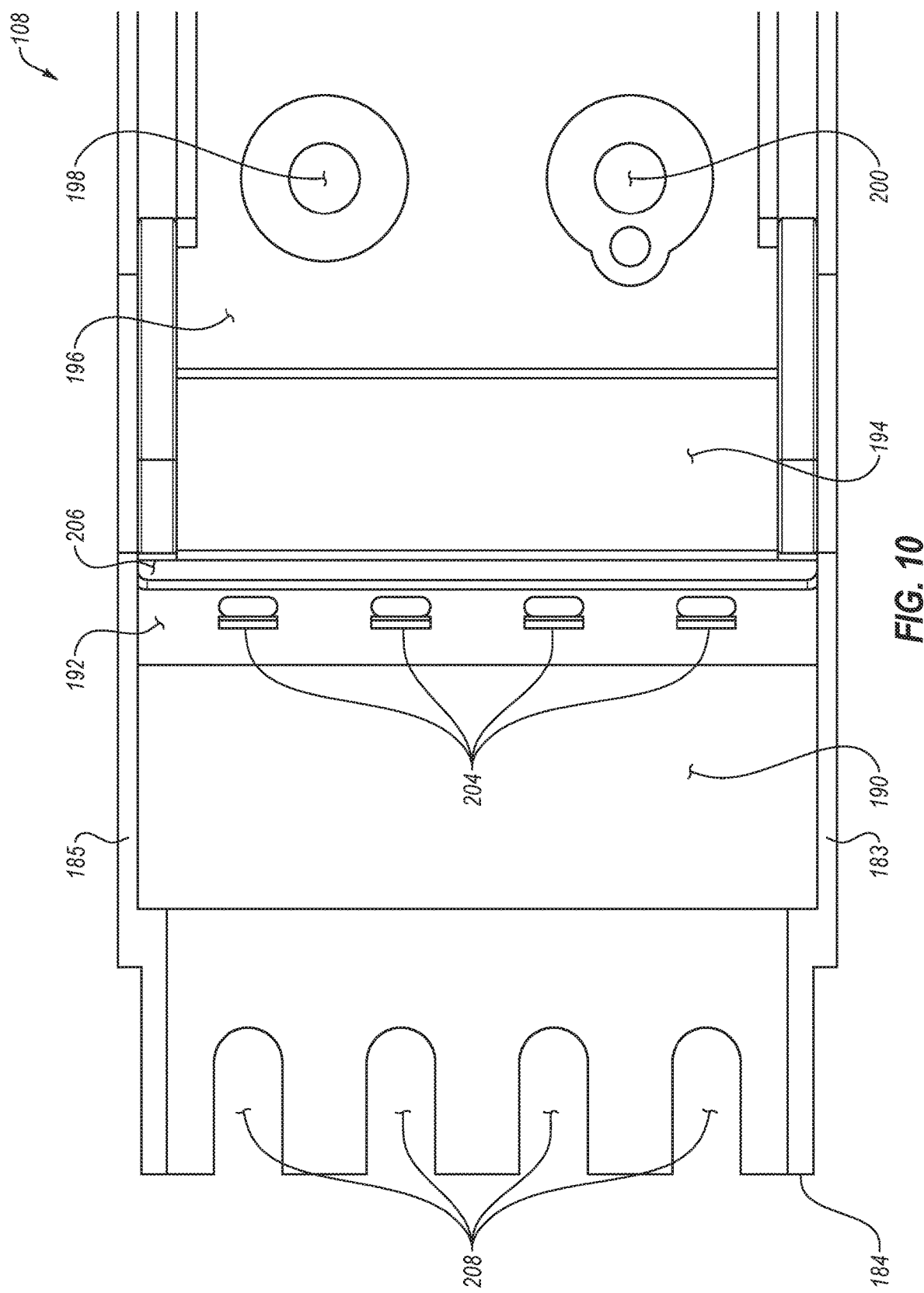
FIG. 10 is an enlarged view of an end portion of the first portion of the housing illustrated in FIG. 8.

First portion 108 of housing 102 is shown in greater detail in FIGS. 8-10. First portion 108 includes a sidewall 183 positioned opposite of a sidewall 185, and sidewalls 183 and 185 extend along at least a portion of the length of first portion 108 between its first end 184 and its second end 186. A ramped or angled portion 188 is positioned between first end 184 and second end 186 such that first end 184 and second end 186 are offset from one another. On its side facing second portion 110 of housing 102, first portion 108 includes portions 190, 192, 194 and 196 which are offset from one another. More particularly, in the orientation of first portion 108 relative to second portion 110 shown in FIG. 1 for example, portion 192 is offset toward second portion 110 of housing 102 relative to portion 190, portion 194 is offset toward second portion 110 of housing 102 relative to portion 192, and portion 196 is offset toward second portion 110 of housing 102 relative to portion 194.

First portion 108 also includes apertures 198, 200 and 202 configured to receive fasteners 142, 144 and 146. As best seen in FIG. 1 for example, a surface of first portion 108 of housing 102 may be countersunk around apertures 198, 200 and 202 so that fasteners 142, 144 and 146 may be positioned flush with or below the surface of first portion 108. At portion 192, first portion 108 includes a plurality of spaced apart tabs or projections 204 which extend from the surface of portion 192 toward second portion 110. An elongated slot 206 extends between sidewalls 183 and 185 and is positioned between portions 192 and 194 of first portion 108. The bottom surface of elongated slot 206 is recessed into first portion 108 relative to the surface of portion 192. At first end 184 of first portion 108, a plurality of elongated openings or slots 208 extend through first portion 108 and are configured to receive tab 1308 of connector 1302 of fiber optic cable 1300. Openings 208 have a substantially U-shaped configuration in the illustrated form, but they may be shaped differently in other forms.

Turning to FIGS. 11-14, receiving member 140 includes a body 210 which extends between sides 212 and 214 and a first surface 216 and a second surface 218, respectively. Body 210 further includes a front surface 220 positioned opposite of a rear surface 222. A plurality of engagement members 224 spaced apart from one another extend from front surface 220 of body 210 and are positioned opposite of a plurality of engagement members 226 spaced apart from one another and extending from front surface 220 of body 210.

Engagement members 224 include a main portion 228 having oppositely positioned and surfaces 230, 232. Engagement members 224 also include an end portion 234 such that main portion 228 is positioned between end portion 234 and body 210. End portion 234 includes a surface 236 which extends obliquely to surface 230 of main portion 228. End portion 234 also includes a first surface 238 which intersects with surface 236 at rounded nose 240 and extends obliquely to surface 232 of main portion 228, a second surface 242 which extends obliquely to surface 232 of main portion 228 and transversely to first surface 238, and a third surface 244 positioned between and connecting first and second surfaces 238 and 242.

Similar to engagement members 224, engagement members 226 include a main portion 246 having oppositely positioned surfaces 248 and 250. Engagement members 226 also include an end portion 252 such that main portion 246 is positioned between end portion 252 and body 210. End portion 252 includes a surface 254 which extends obliquely to surface 250 of main portion 246. End portion 252 also includes a surface 256 which intersects with surface 254 at rounded nose 258 and extends obliquely to surface 248 of main portion 246, a surface 260 which extends obliquely to surface 248 of main portion 246 and transversely to surface 256, and a surface 262 positioned between and connecting surfaces 256 and 260.

Engagement members 224 and engagement members 226 cooperate to define a plurality of ports 264 each configured to receive a portion of connector 1302 of fiber optic cable 1300. More specifically, as connector 1302 is positioned into a port 264, it engages with surface 238 of an engagement member 224 and surface 256 of an engagement member 226 in order to deflect engagement member 224 in the direction of arrow A and engagement member 226 in the direction of arrow B. Once connector 1302 has been sufficiently positioned in port 264, end portion 234 is received in receptacle 1312 of connector 1302 and engagement member 224 returns to the position illustrated in FIG. 14. Similarly, end portion 252 is received in receptacle 1314 of connector 1302 and engagement member 226 returns to the position illustrated in FIG. 14. In this arrangement, engagement members 224 and engagement members 226 cooperate to releasably couple connector 1302 with receiving member 140 and, in turn, optoelectronic module 100.

As noted above, first portion 108 of housing 102 includes portion 190 which is offset relative to portion 192. When receiving member 140 is positioned in housing 102, this arrangement may provide the space necessary for engagement members 224 to deflect in the direction of arrow A as connector 1302 begins engagement therewith. Moreover, second portion 110 of housing 102 includes openings 180 which allow engagement members 226 to deflect in the direction of arrow B as connector 1302 begins engagement therewith when receiving member 140 is positioned in housing 102.

Receiving member 140 further includes a plurality of retaining members 266 positioned on surface 216 of body 210, and a plurality of retaining members 268 positioned on surface 218 of body 210. In the illustrated form, retaining members 266, 268 are formed as an integral portion of plate 270 which may be coupled with receiving member 140, although forms in which retaining members 266, 268 or plate 270 are formed integrally with receiving member 140 are possible. Receiving member 140 includes a plurality of projections or tabs 272 positioned on surface 216 of body 210, and a plurality of projections or tabs 274 positioned on surface 218 of body 210. Moreover, retaining members 266 each include an aperture or opening 276 and retaining members 268 each include an aperture or opening 276. In this arrangement, plate 270 may be positioned against body 210 and tabs 272 may be received in openings 276 and tabs 274 may be received in openings 278 in order to couple plate 270, and retaining members 266, 268, with body 210.

Figure 14:
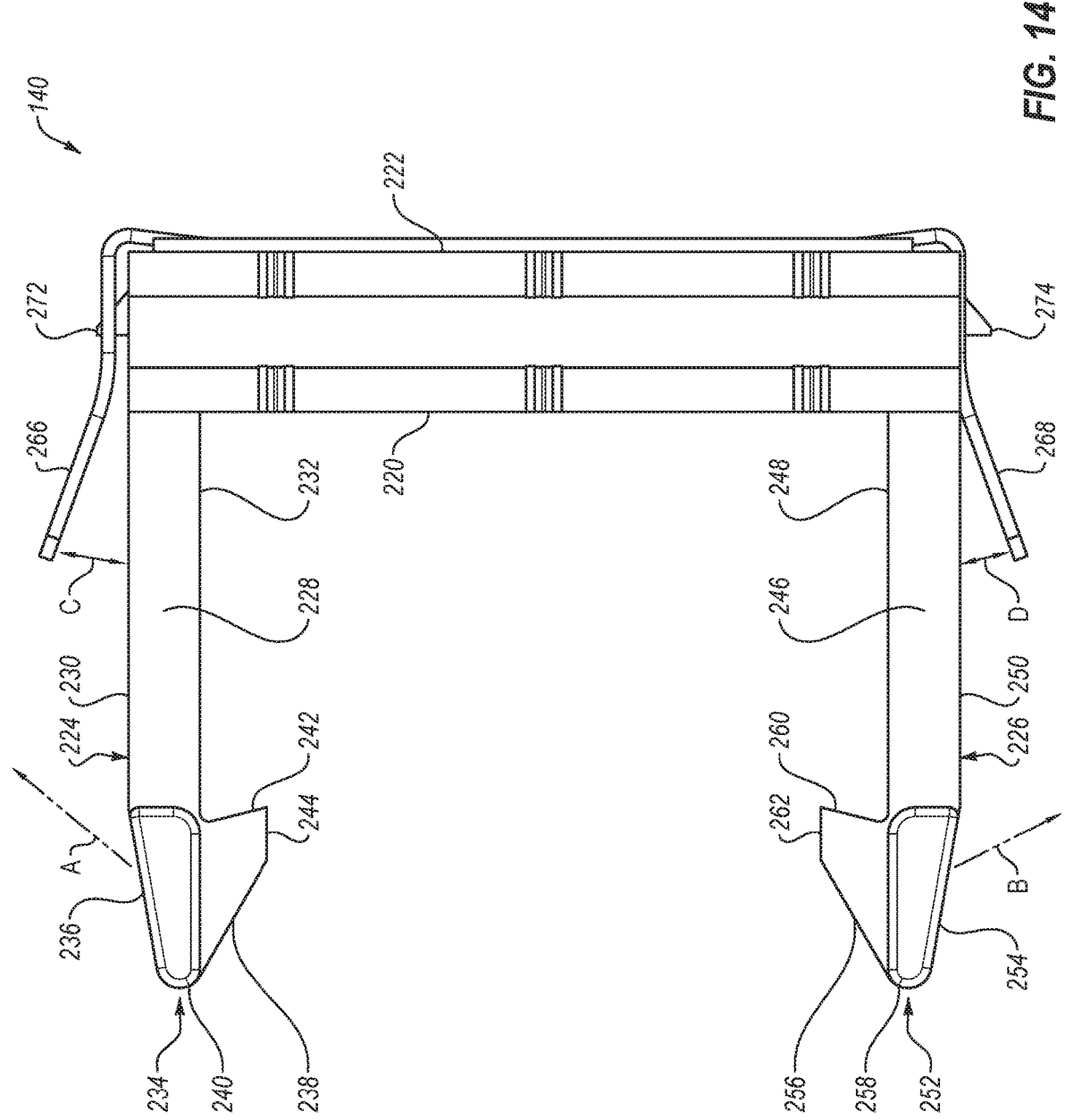
FIG. 14 is a side view of the receiving member illustrated in FIG. 11.

In order to help facilitate assembly of optoelectronic module 100, retaining members 266, 268 may be flexible or deformable to facilitate their movement as indicated by directional arrows C and D (FIG. 14). When receiving member 140 is positioned in housing 102, tabs 272 are aligned with and positioned in elongated slot 206 and retaining members 266 bear against tabs 204, which define a receptacle for receiving retaining members 266, extending from first portion 108 of housing 102 toward second portion 110 of housing 102. Moreover, when receiving member 140 is so positioned, tabs 274 and retaining members 268 are positioned in elongated slot 176, which also defines a receptacle for receiving retaining members 268, such that retaining members 268 bear against surface 177 of elongated slot 176. In this configuration, the engagement of retaining members 266 and 268 with tabs 204 and surface 177, respectively, prevents movement of receiving member 140 along longitudinal axis L toward first end 104 of housing 102.

Receiving member 140 includes a first recessed portion 280 positioned along first side 212 of body 210 and opposite of a second recessed portion 282 positioned along second side 214 of body 210. First and second recessed portions 280 and 282 both extend between surface 216 and surface 218 of body 210. During assembly of optoelectronic module 100, receiving member 140 may be first positioned in second portion 110 of housing 102 with first recessed portion 280 of body 210 aligned with recessed portion 172 of second portion 110 such that recessed portions 172 and 280 cooperate to form a receptacle. Similarly, second recessed portion 282 of body 210 may be aligned with recessed portion 174 of second portion 110 such that recessed portions 174, 282 cooperate to form a receptacle. Retaining member 136 may be positioned in the receptacle formed by cooperation of recessed portions 172 and 280, and retaining member 138 may be positioned in the receptacle formed by cooperation of recessed portions 174, 282. In this arrangement, retaining members 136, 138 are positioned between and engage with receiving member 140 and second portion 110 of housing 102 to prevent movement of receiving member 140 relative to housing 102. With retaining member 136, 138 positioned in this manner, first portion 108 of housing 102 may be positioned over and engaged with second portion 110 of housing 102.

Body 210 of receiving member 140 includes a plurality of openings 284 which include a generally circular portion connected to a generally circular portion by a straight section. Each of openings 284 is configured to receive a pair of receptacles 118, with one receptacle 118 positioned in the generally circular portion and one receptacle 118 positioned in the generally circular portion. In this arrangement, at least a portion of receptacles 118 extends past front surface 220 of body 210. As best seen in FIG. 11 for example, plate 270 also includes a plurality of openings 286 which generally correspond in size and shape with openings 284 in order to facilitate passage of receptacles 118 through plate 270.

In FIG. 11, biasing member 150 is illustrated relative to receiving member 140 and plate 270. In the illustrated form, biasing member 150 is separate from receiving member 140. Forms where biasing member 150 is directly coupled or formed integrally with receiving member 140 may be also possible. Biasing member 150 is positioned in housing 102 between receiving member 140 and partition 166 of second portion 110 of housing 102. In this arrangement, biasing member 150 applies a force in the direction of first end 104 which maintains retaining members 266 and 268 in engagement with first portion 108 and second portion 110, respectively, of housing 102. As best seen in FIG. 11 for example, biasing member 150 includes a plurality of openings 285 which generally correspond in size and shape with openings 284 in order to facilitate passage of receptacles 118 through biasing member 150.

Biasing member 150 may be provided in any form that results in the application of a biasing force on receiving member 140 in the direction of first end 104. In one form for example, biasing member 150 may have a spring-like configuration or be a gasket formed of a material yielding spring-like properties, such as rubber for example. All or part of biasing member 150 may also be formed of a material which provides electromagnetic interference (EMI) attenuating effects. Examples of such materials include an EMI plastic including a plastic with nickel coated carbon fiber, although other materials are contemplated, such as stainless steel fillers, carbon fillers, or any filler made of electrically conductive material. In another example, an EMI plastic may include a combination of nickel coated carbon fiber and stainless steel. In some circumstances, the materials or process of formation of the EMI plastic may depend on the desired amount attenuation or desired frequencies to be attenuated. When all or part of biasing member 150 is formed of an EMI attenuating material, biasing member 150 may attenuate EMI generated by components of optoelectronic module 100.

Figure 15:
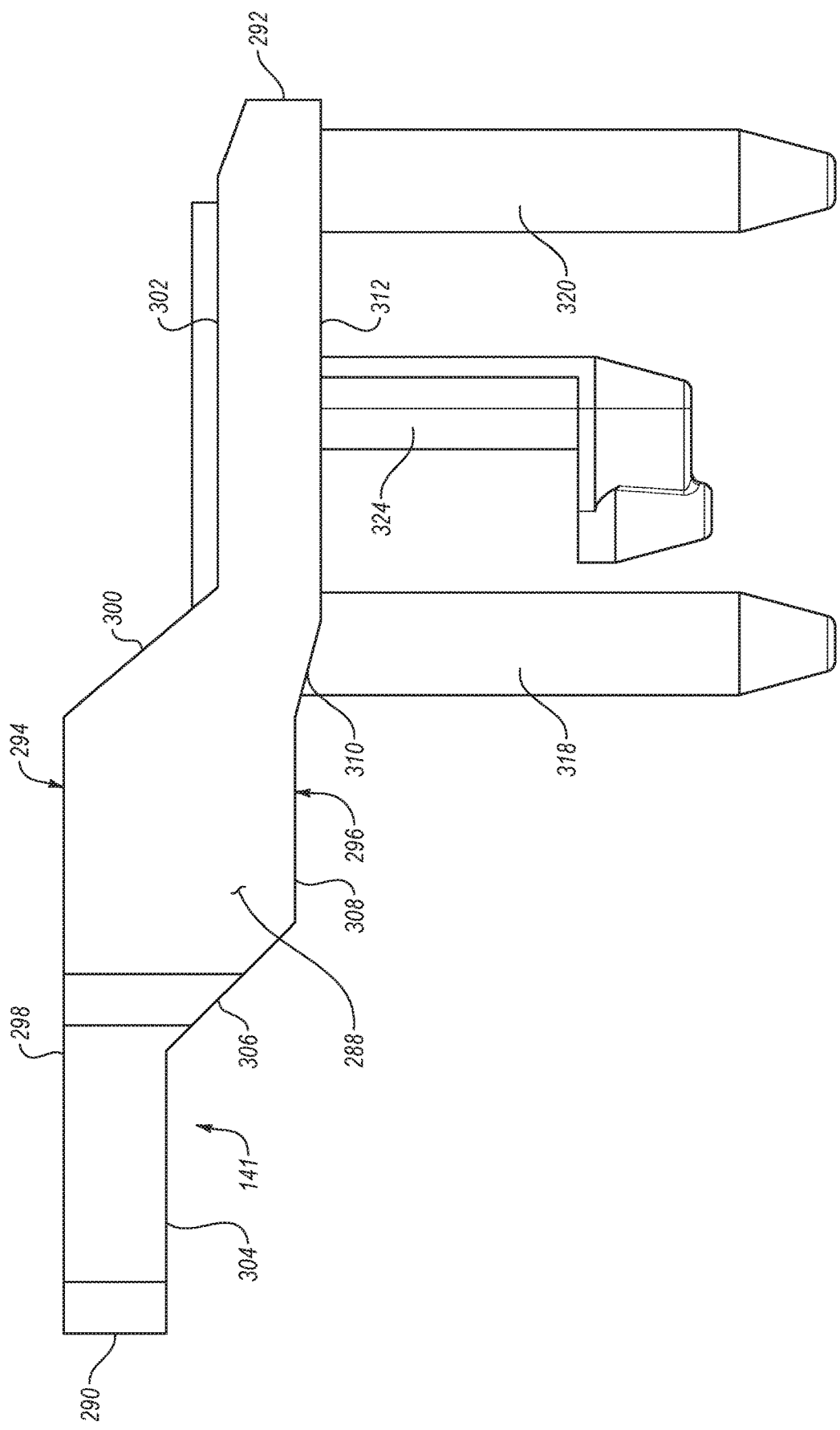
FIG. 15 is a side view of a receptacle retaining member of the optoelectronic module illustrated in FIG. 1.
Figure 16:
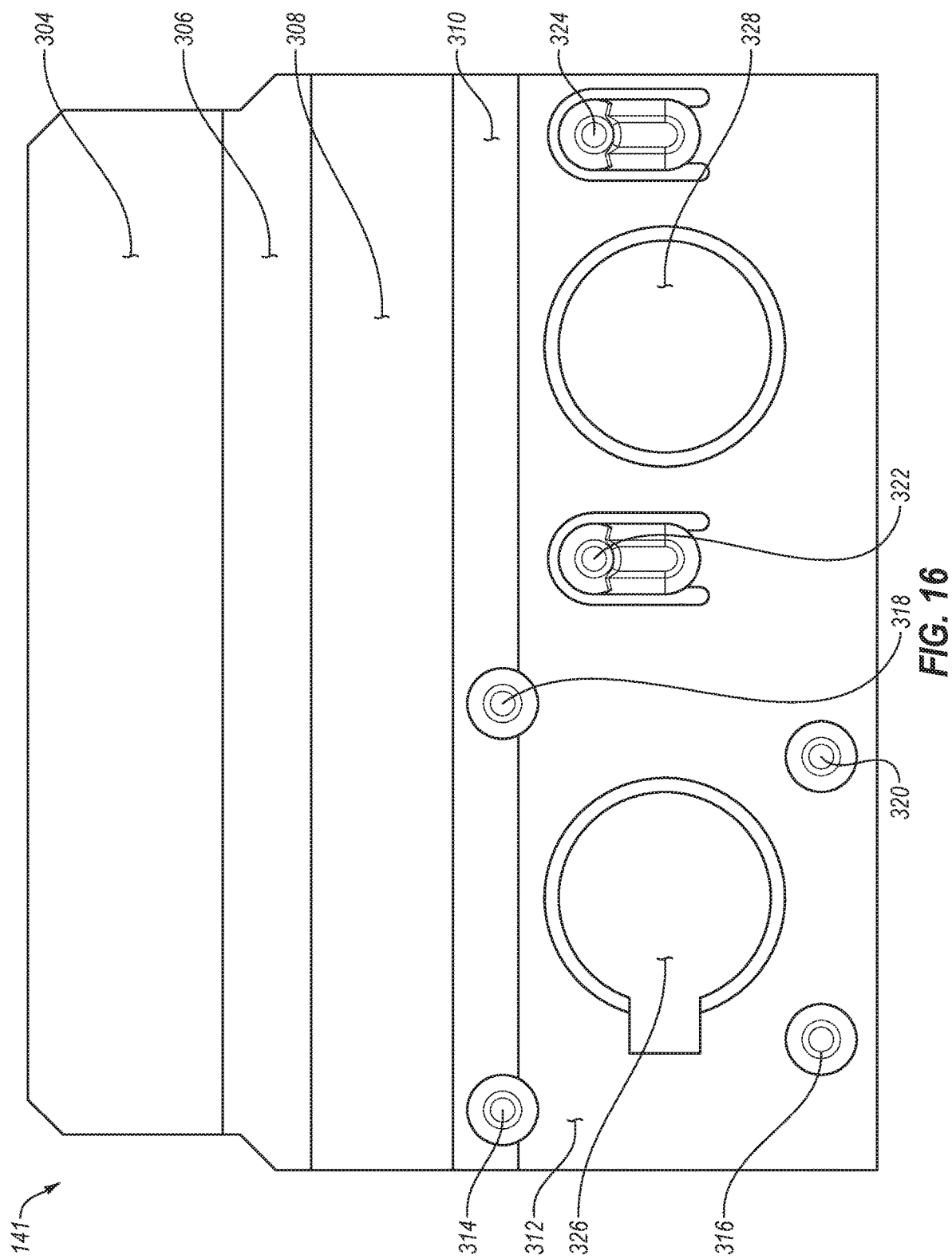
FIG. 16 is a plan view of the underside of the receptacle retaining member illustrated in FIG. 15.

Views of a side and underside of receptacle retaining member 141 are illustrated in FIGS. 15 and 16, respectively. Receptacle retaining member 141 includes a body 288 extending between a first end 290 and an opposite, second end 292. Body 288 includes a surface 294 positioned opposite of a surface 296. Surface 294 includes a first portion 298, a second portion 300, and a third portion 302. Second portion 300 extends obliquely to and connects first and third portions 298 and 302 which extend inline with or parallel to one another. Surface 296 includes a first portion 304, a second portion 306, a third portion 308, a fourth portion 310, and a fifth portion 312. In the illustrated form, first portion 304, third portion 308, and fifth portion 312 generally extend inline or parallel with one another, second portion 306 extends obliquely to and connects first portion 304 and third portion 308, fourth portion 310 extends obliquely to and connects third portion 308 and fifth portion 312, and second portion 306 and fourth portion 310 extend transversely to one another. Alternative designs for surface 294 and surface 296 are also contemplated.

Receptacle retaining member 141 further includes guides 314, 316, 318, 320, 322 and 324 which extend from surface 296. In the illustrated form, guides 314 and 318 extend from surface 296 near an intersection between fourth portion 310 and fifth portion 312 of surface 296, and guides 316, 320, 322 and 324 extend from fifth portion 312 of surface 296. In the illustrated form, each of guides 314, 316, 318 and 320 terminates at an end positioned opposite of surface 296 having the shape of a truncated cone. In contrast, each of guides 322 and 324 terminates at an end positioned opposite of surface 296 having a wedge-shaped portion positioned adjacent to a portion which partially has the shape of a truncated cone. Receptacle retaining member 141 also includes an aperture 326 positioned between guides 314, 316, 318 and 320, and an aperture 328 positioned between guides 322 and 324. Apertures 326 and 328 are generally configured to facilitate passage of fasteners 142, 144 through receptacle retaining member 141.

When receptacle retaining member 141 is properly positioned in optoelectronic module 100, first portion 304 of surface 296 engages with receptacles 118 positioned in row 120 of the array of receptacles 118. First portion 108 of housing 102 may be engaged with second portion 110 of housing 102 and fasteners 142, 144 may extend through first portion 108 and receptacle retaining member 141 to engage with bosses 158, 160 of second portion 110. With first portion 108 positioned in this manner, portions 194 and 196 of first portion 108 of housing 102 may engage with first portion 298 and third portion 302, respectively, of receptacle retaining member 141. As a result, receptacle retaining member 141 becomes secured between first portion 108 and receptacles 118, and in turn receptacles 118 become secured between receptacle retaining member 141 and second portion 110 of housing 102. In this arrangement, receptacle retaining member 141 limits movement of receptacles 118 in optoelectronic module 100.

In this arrangement, guides 314, 316, 318, 320, 322 and 324 of receptacle retaining member 141 extend toward second portion 110 of housing 102, and guides 322 and 324 engage with portions 132 and 134 of PCB 112 positioned on opposite sides of opening 130. Guides 314, 316, 318, 320, 322 and 324 also organize and route optical fibers 124 and 126 which optically couple receptacles 118 with one of TOSA 114 and ROSA 116.

Figure 17:
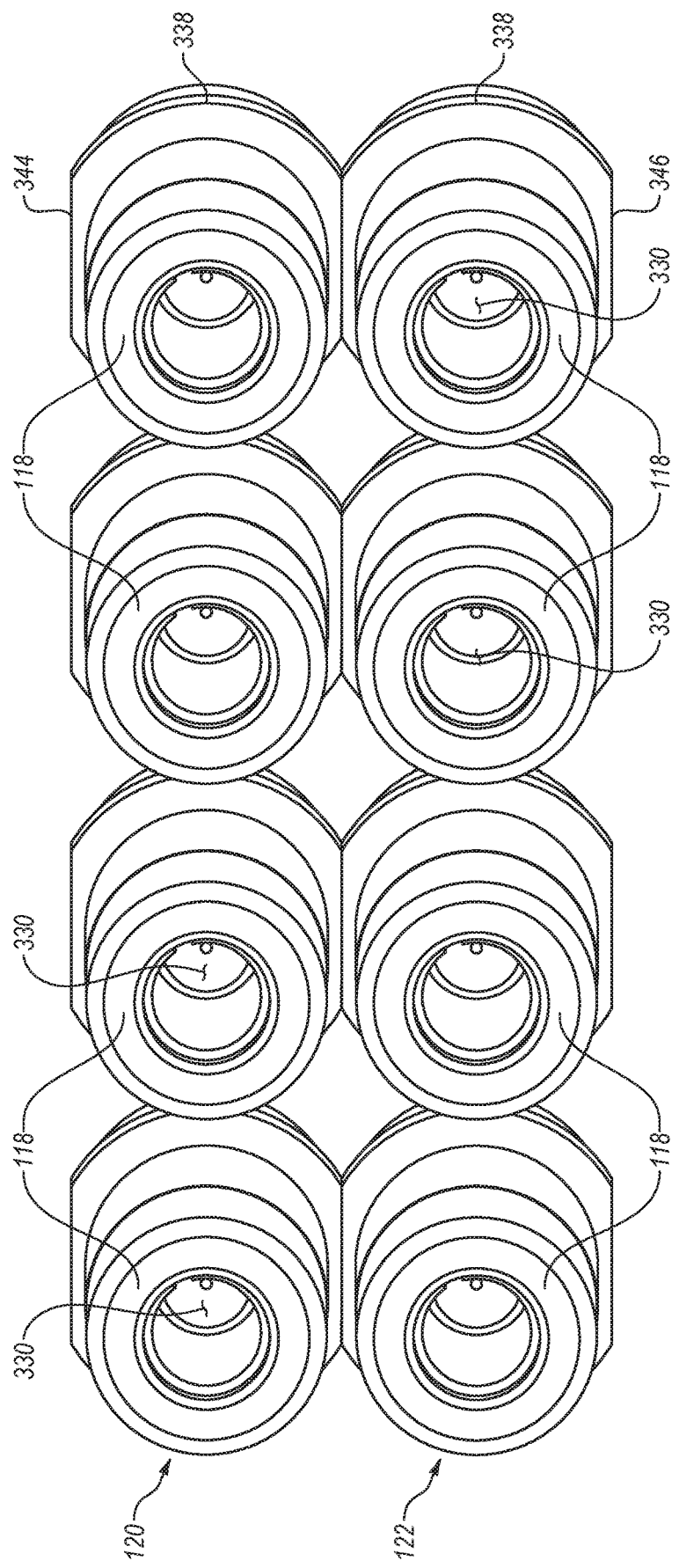
FIG. 17 is a perspective view of a plurality of receptacles of the optoelectronic module of FIG. 1.
Figure 18:
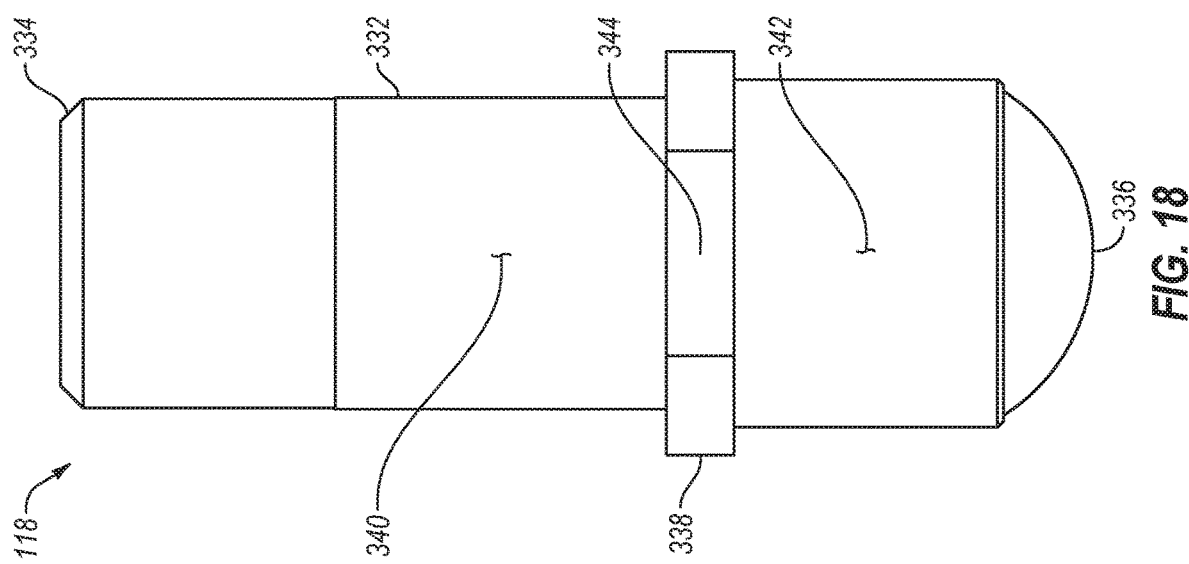
FIG. 18 is a top view of one of the receptacles illustrated in FIG. 17.

A front, perspective view of the array of receptacles 118 of optoelectronic module 100 is illustrated in FIG. 17, while a top, plan view of an individual receptacle 118 is illustrated in FIG. 18. As indicated above, the array or receptacles 118 includes row 120 of receptacles 118 positioned over row 122 of receptacles 118. Receptacles 118 of row 120 are optically coupled with ROSA 116 and receptacles 118 of row 122 are optically coupled with TOSA 114. Variations in connection with TOSA 114 or ROSA 116 between receptacles 118 of row 120 and row 122 may be envisioned. Each of receptacles 118 includes a socket 330, only a few of which have been identified in FIG. 17 in order to preserve clarity, which is configured to receive one of ferrules 1316 or 1318 of connector 1302.

Each of receptacles 118 includes a body 332 which extends between a first end 334 and an opposite second end 336. First end 334 may include socket 330, and one of optical fibers 124 and 126 may extend from second end 336. In the illustrated form, first end 334 has a generally planar configuration while second end 336 has a rounded configuration; however, other design variations for first end 334 and second end 336 may be possible. Body 332 further includes a flange 338, and a first portion 340 of body 332 is positioned on a first side of flange 338 and a second portion 342 of body 332 is positioned on a second side of flange 338. In the illustrated form, second portion 342 of body 332 is enlarged relative to first portion 340 of body 332, although in some forms first and second portions 340, 342 may be the same size or first portion 340 is enlarged relative to second portion 342.

Flange 338 generally includes an annular configuration that extends radially about body 332. Flange 338 further includes a pair of oppositely positioned surfaces 344 and 346 which, in the illustrated form, are generally flat and extend parallel to one another. As shown in FIG. 17 for example, receptacles 118 may be positioned on top of one another with surface 346 positioned on surface 344 of another receptacle. Moreover, in one form for example, receptacles 118 of row 122 may be positioned in optoelectronic module 100 with flat surfaces 346 thereof positioned against a corresponding surface of second portion 110 of housing 102. However, forms in which flat surfaces 346 are not positioned against a surface of second portion 110 of housing 102 are also possible. In one form, relative positioning of receptacles 118 with flat surfaces 346 positioned on flat surfaces 344, or with flat surfaces 346 positioned against a surface of second portion 110 of housing 102, may prevent rotation of receptacles 118 relative to one another or relative to housing 102.

Receptacles 118 are positioned in optoelectronic module 100 with a least portion thereof situated in a respective one of openings 168 in partition 166 of second portion 110 of housing 102. More specifically, the enlarged, second portion 342 of body 332 of each receptacle 118 is positioned in a respective opening 168 with a portion of flange 338 positioned against a surface of partition 166 facing first end 104 of housing 102. A portion of each of receptacles 118 also extends through openings 285 of biasing member 150 and through openings 284 of receiving member 140. However, each flange 338 of receptacles 118 is positioned between receiving member 140 and partition 166. In this configuration, movement of receptacles 118 along longitudinal axis L in optoelectronic module 100 is at least partially limited, although movement may be prevented, by partition 166 and receiving member 140 which is fixed relative to housing 102 as described herein. Moreover, since a portion of each of receptacles 118 extends through receiving member 140, receptacles 118 are accessible for engagement with a connector 1302 of a fiber optic cable 1300.

Figure 19:
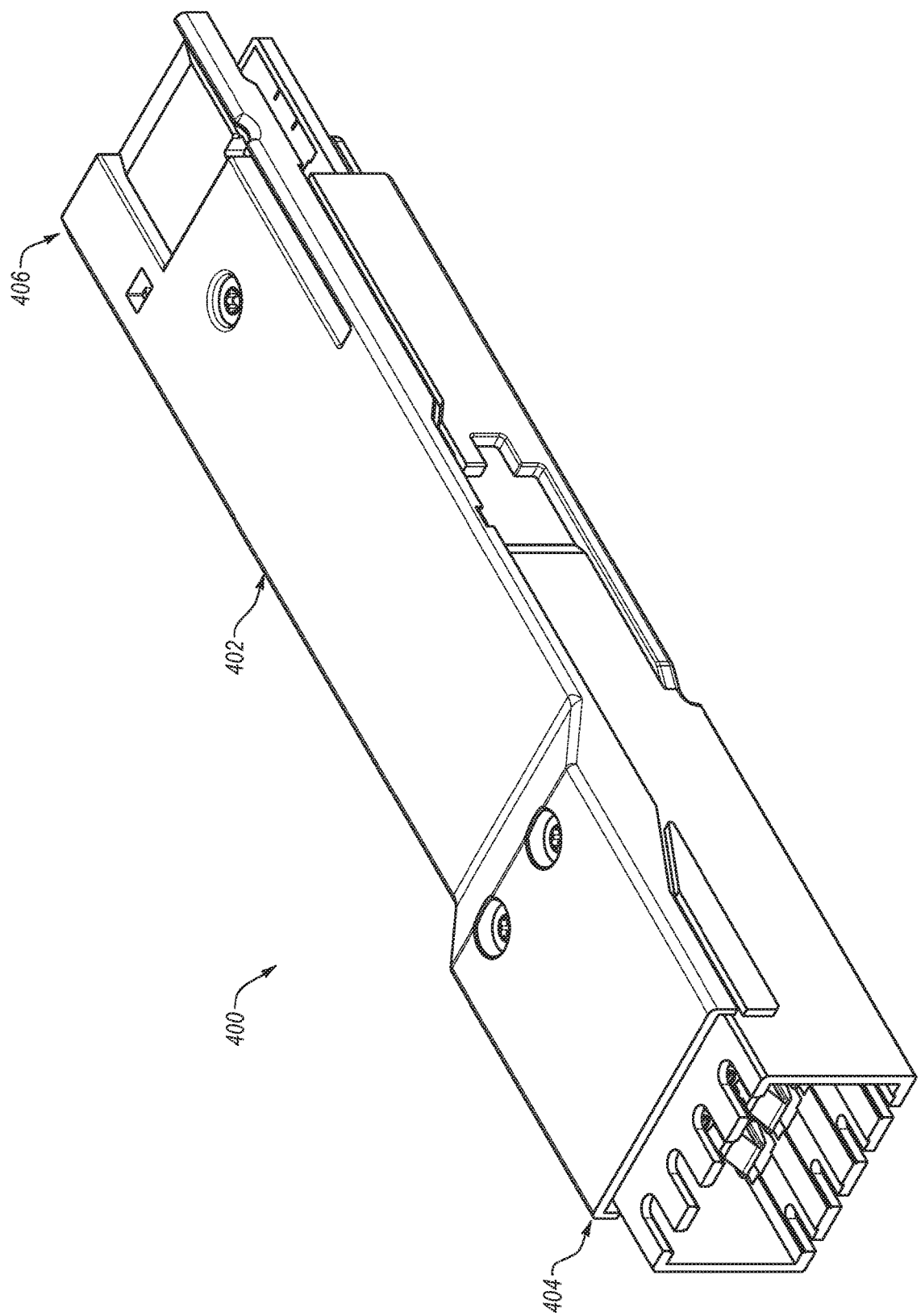
FIG. 19 is a perspective view of an alternative embodiment optoelectronic module which may be connected with the fiber optic cable illustrated in FIG. 1.
Figure 20:
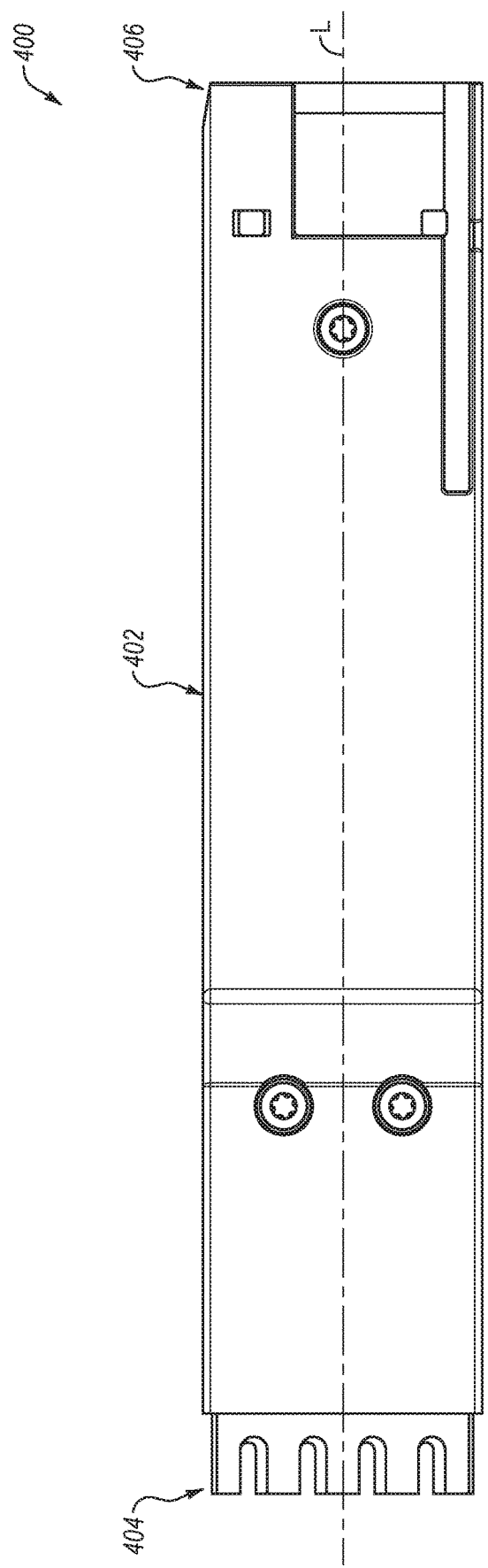
FIG. 20 is a top, plan view of the optoelectronic module of FIG. 19.
Figure 21:
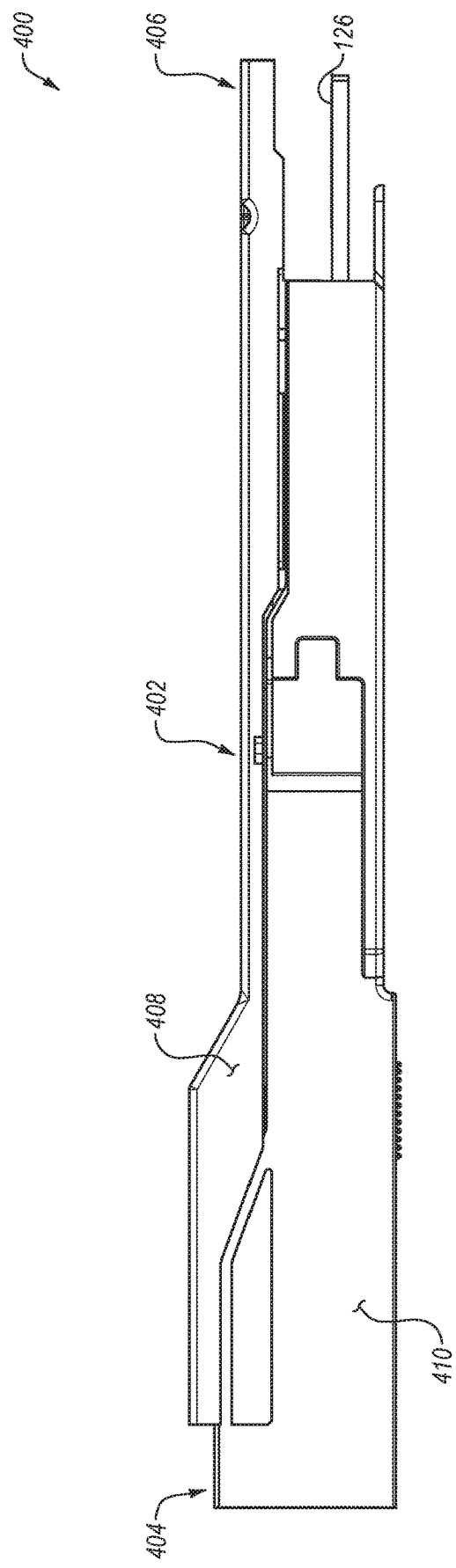
FIG. 21 is a side view of the optoelectronic module of FIG. 19.

A perspective view of an alternative embodiment optoelectronic module 400 is illustrated in FIG. 19. Top and side views of optoelectronic module 400 are illustrated in FIGS. 20 and 21, respectively. As will be explained in greater detail, optoelectronic module 400 is similar to optoelectronic module 100 previously described herein. As shown in FIGS. 19-21, where like numerals refer to like features previously described, optoelectronic module 400 includes a housing 402 that extends along a longitudinal axis L of optoelectronic module 400 between a first end 404 and a second end 406 of optoelectronic module 400. Housing 402 includes a first portion 408 and second portion 410 which are configured to engage with one another in order to house a number of components of optoelectronic module 400.

First end 404 of optoelectronic module 400 is configured to interface with a fiber optic cable 1300 including one or more optical fibers as illustrated in FIGS. 1 and 2. Similarly, a fiber optic cable 1300 may be releasably connected to first end 404 and extend in line with longitudinal axis L. In forms where fiber optic cable 1300 is releasably connected to optoelectronic module 400, optoelectronic module 400 may function as a stand-alone module. However, optoelectronic module 400 may be permanently attached to fiber optic cable 1300, and thus optoelectronic module 400 represents one end of an "active cable" which may include another optoelectronic module permanently attached to the other end of fiber optic cable 1300. In some embodiments, fiber optic cable 1300 is a multichannel fiber-optic communication cable that includes two fibers, one of which is employed to transfer data signals in one direction, and the other of which is employed to transfer data signals in the opposite direction.

Similar to optoelectronic module 100, up to four separate fiber optic cables 1300 may be releasably connected with optoelectronic module 400. However, embodiments of optoelectronic module 400 where it may be releasably connected to more or less than four separate fiber optic cables 1300 are contemplated, and optoelectronic module 400 may be used with less than the total maximum possible number of fiber optic cables 1300 connected therewith. For example, optoelectronic module 400 could be used with one, two or three fiber optic cables 1300 connected thereto.

Turning back now more specifically to optoelectronic module 400, it may be configured for optical signal transmission and reception at a variety of per-second data rates including, but not limited to, 150 gigabits per second (Gb/s) or higher. In addition, although the example optoelectronic module 400 is configured to be substantially compliant with the CXP multisource agreement (MSA), optoelectronic module 400 can instead be configured to assume a variety of different form factors that are substantially compliant with various transceiver or transponder MSAs including, but not limited to, C form-factor pluggable (CFP), small form factor (SFF), small form-factor pluggable (SFP), 10 Gigabit small form factor pluggable (XFP), XPAK, X2, XENPAK, or quad small form-factor pluggable (QSFP).

Optoelectronic module 400 may be designed to be plugged into a larger electronic system such as a PCB of a host device or the like. For example, optoelectronic module 400 may include a latching mechanism with a handle that may be operated to fasten or release optoelectronic module with respect to other components. In some configurations, the latching mechanism may include a slider operably connected to a cam and configured to cause the cam to rotate about an axis of rotation to displace an end of a latch to disengage the latch from a host receptacle. Once mounted to a host PCB, optoelectronic module 400 may be configured to communicate data between the host device and a network, for example.

Optoelectronic module 400 may convert electrical signals to optical signals representing the electrical signals and vice versa. For example, data in the form of optical signals may be communicated from a network along fiber optic cable 1300 to optoelectronic module 400. Components of optoelectronic module 400 may convert the optical signals to electrical signals representative of the optical signals. The electrical signals may then be communicated to the host device. Likewise, the host device may communicate electrical signals to optoelectronic module 400. Optoelectronic module 400 may convert the electrical signals to optical signals representative of the electrical signals. The optical signals may be communicated along fiber optic cable 1300 into the network to, by way of non-limiting example, another optoelectronic module 400.

Figure 22:
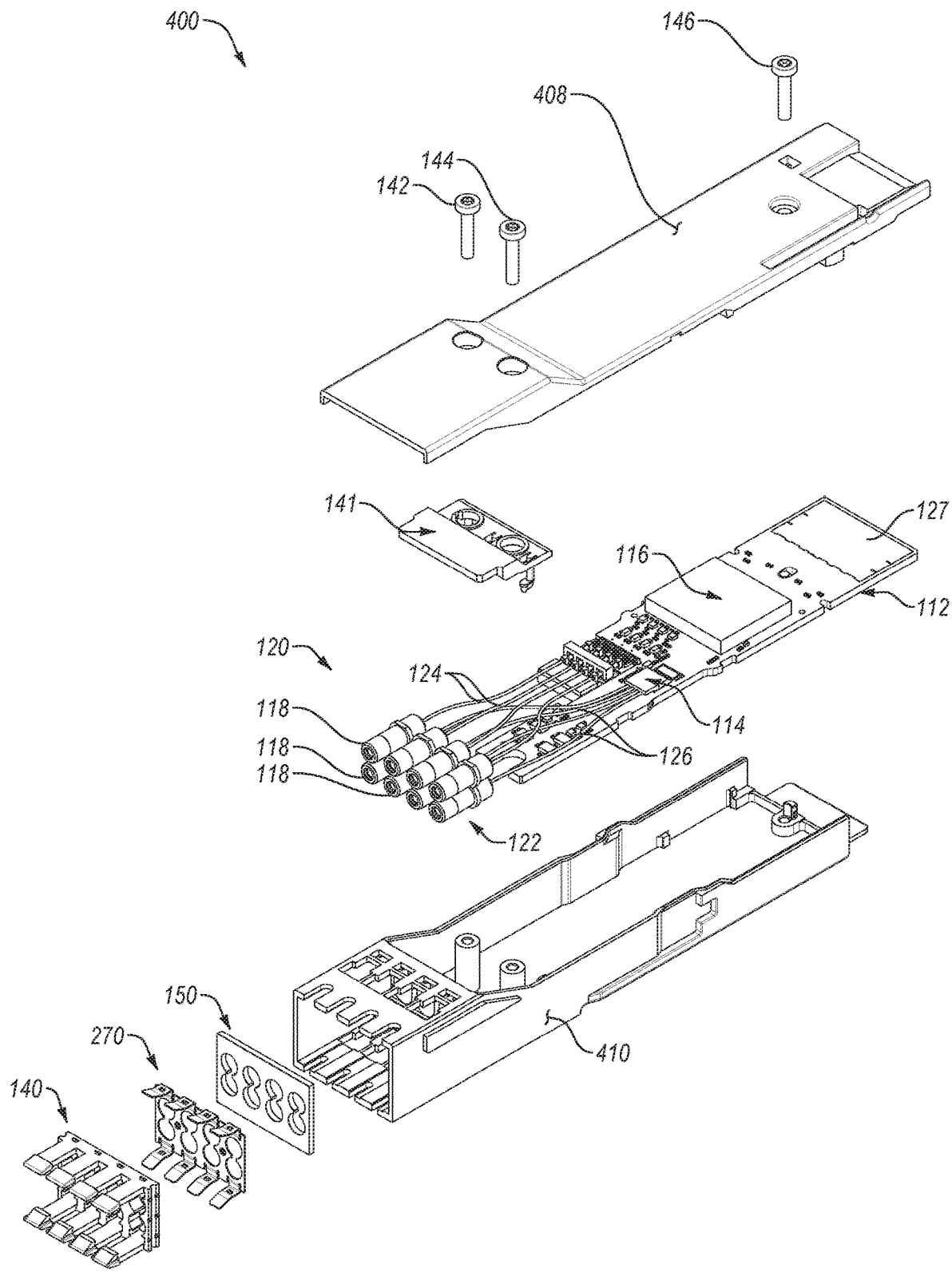
FIG. 22 is a perspective, exploded view of the optoelectronic module of FIG. 19.

FIG. 22 is an exploded view of optoelectronic module 400, where like numerals refer to like features previously described in connection with optoelectronic module 100. As indicated above, optoelectronic module 400 is similar to optoelectronic module 100 previously described herein, although these modules differ in some respects as will be appreciated from the description that follows.

Figure 23:
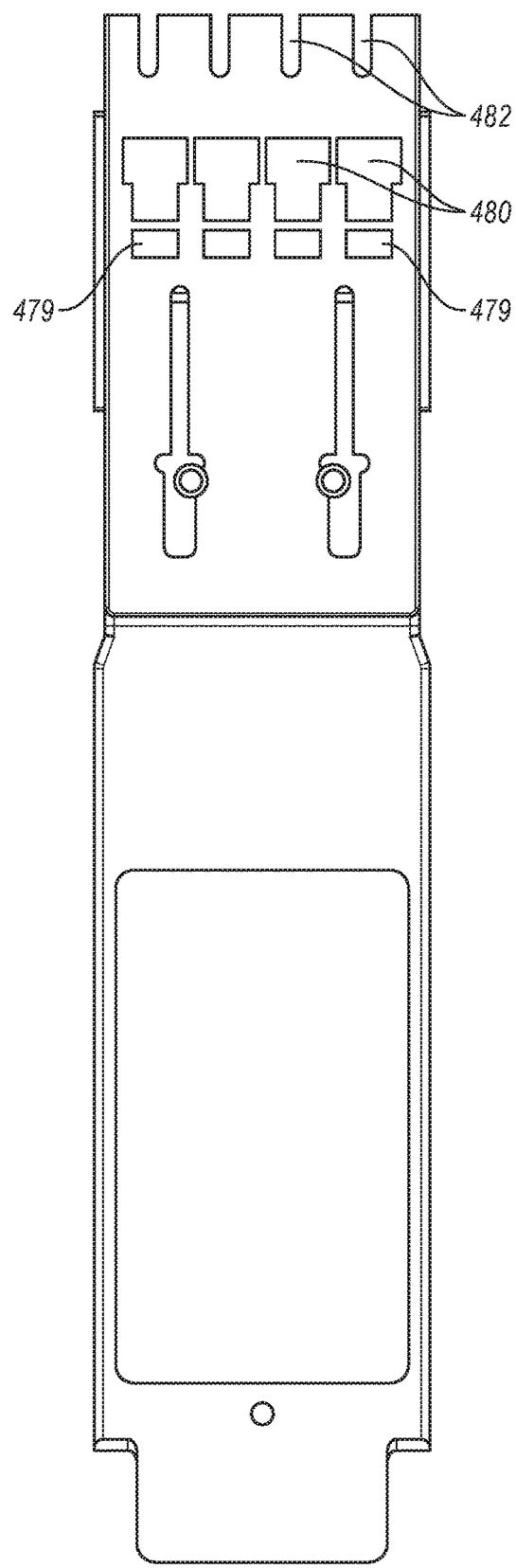
FIG. 23 is a bottom view of a second portion of the housing of the optoelectronic module of FIG. 19.
Figure 24:
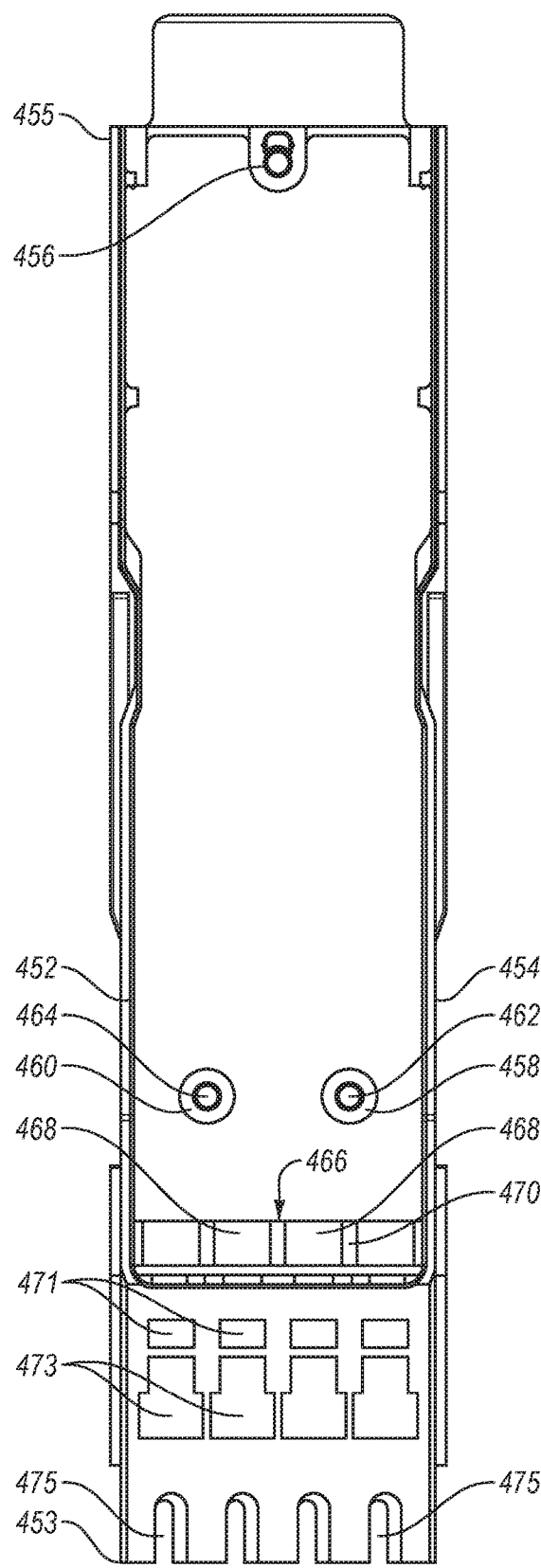
FIG. 24 is a top, plan view of a second portion of the housing of the optoelectronic module of FIG. 19.
Figure 25:
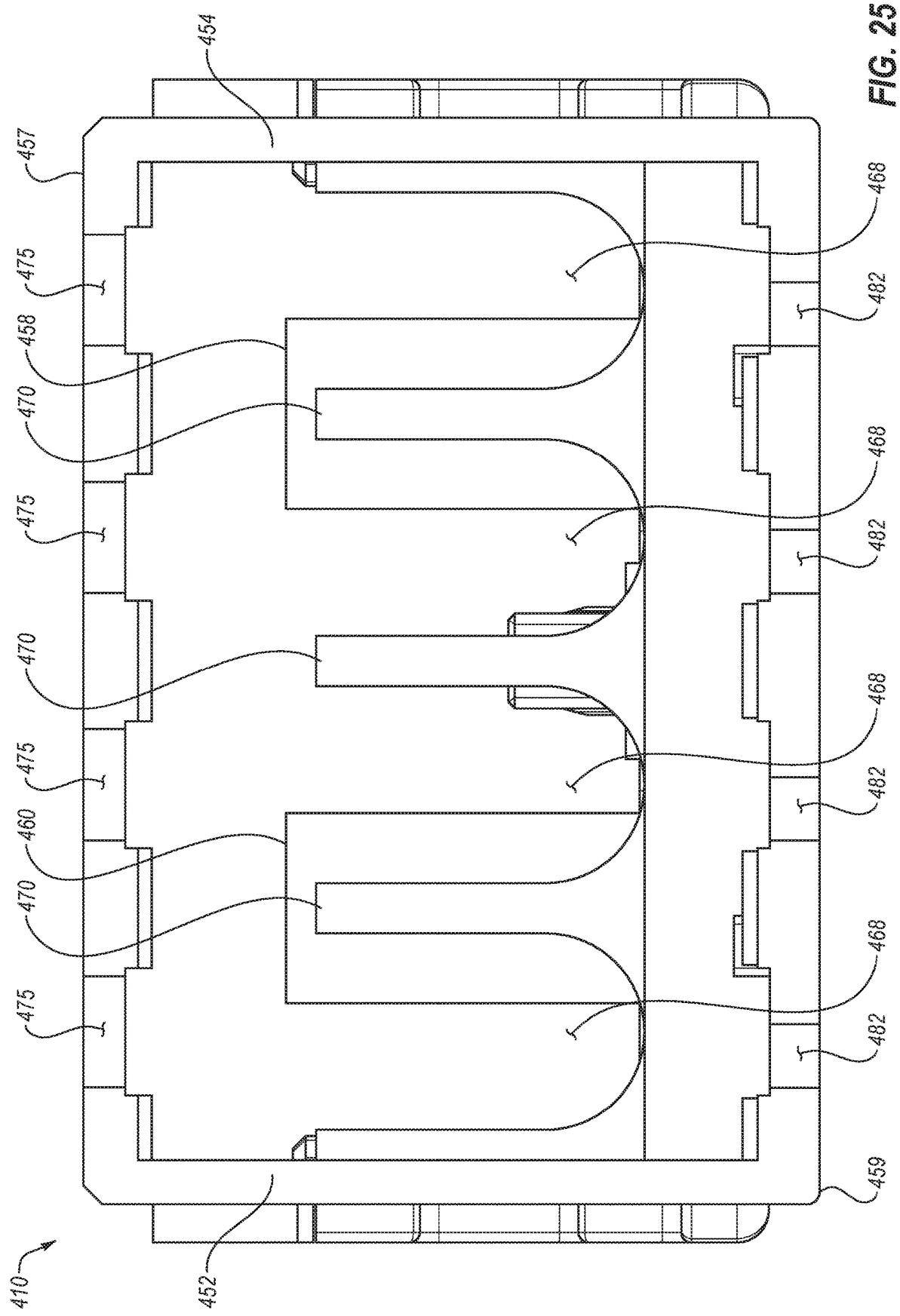
FIG. 25 is an end view of a second portion of the housing of the optoelectronic module of FIG. 19.

In FIGS. 23-25, second portion 410 of housing 402 is shown in bottom, top and end views, respectively. Amongst other features shown, second portion 410 includes a sidewall 452 positioned opposite of a sidewall 454. Generally speaking, sidewalls 452 and 454 extend between and terminate at opposite ends 453 and 455 of second portion 410 such that, when coupled with first portion 408 of housing 402, first end 404 and second end 406 of housing 402 are generally open. As best seen in FIG. 25 for example, at end 453 second portion 410 of housing 402 includes a top portion 457 which extends between sidewalls 452 and 454, and a bottom portion 459 which extends between sidewalls 452 and 454.

Second portion 410 further includes an aperture 456 structured to receive fastener 146. A pair of bosses 458 and 460 extend from second portion 410 toward first portion 408. Boss 458 includes an aperture 462 configured to receive fastener 144, and boss 460 includes an aperture 464 configured to receive fastener 142. In one non-limiting form, fasteners 142, 144 and 146 may be externally threaded and apertures 456, 462, and 464 may include a corresponding internal threading for providing a threaded engagement between fasteners 142, 144 and 146 and apertures 456, 462, and 464, although other configurations for connecting these components are possible.

A partition 466 is positioned between bosses 458 and 460 and first end 404. Partition 466 extends between sidewalls 452 and 454 and toward first portion 408 of housing 402. Partition 466 includes a number of openings 468 separated by dividing portions 470 of partition 466. Only a few of openings 468 and dividing portions 170 have been identified in FIG. 24 in order to preserve clarity. Each of openings 468 has a generally U-shaped configuration and is configured to receive one or more of receptacles 118 illustrated in FIG. 22. In the illustrated form, second portion 410 includes four (4) openings 468 which are separated by three (3) dividing portions 470 of partition 466. In this configuration, each of openings 468 can receive two (2) of the eight (8) receptacles 118 included in the representative embodiment. Forms where optoelectronic module 400 may include more or less than eight (8) receptacles 118, partition 466 could be modified to include a different number of openings 468 for receiving the particular number of receptacles 118 present.

As best seen in FIG. 24 for example, top portion 457 includes a plurality of apertures 471 positioned near but spaced apart from openings 473. Apertures 471 and openings 473 extend through top portion 457, although in some forms these features may not extend entirely through top portion 457. At end 453, top portion 457 includes a plurality of elongated openings or slots 475 which extend through top portion 457 and are configured to receive tab 1310 of connector 1302 of fiber optic cable 1300. While openings 475 have a substantially U-shaped configuration in the illustrated form, other shapes for openings 475 are possible. Also, only a few of apertures 471, openings 473 and openings 475 have been identified in FIG. 24 to preserve clarity.

As best seen in FIG. 23 for example, bottom portion 459 includes a plurality of apertures 479 positioned near but spaced apart from openings 480. Apertures 479 and openings 480 extend through bottom portion 459, although in some forms these features may not extend entirely through bottom portion 459. At end 453, bottom portion 459 includes a plurality of elongated openings or slots 482 which extend through bottom portion 459 and are configured to receive tab 1310 of connector 1302 of fiber optic cable 1300. As best seen in FIG. 25 for example, elongated openings 475 are offset relative to elongated openings 482. While openings 482 have a substantially U-shaped configuration in the illustrated form, openings 482 may be shaped differently in other forms. Also, only a few of apertures 479, openings 480 and openings 482 have been identified in FIG. 23 to preserve clarity.

Figure 26:
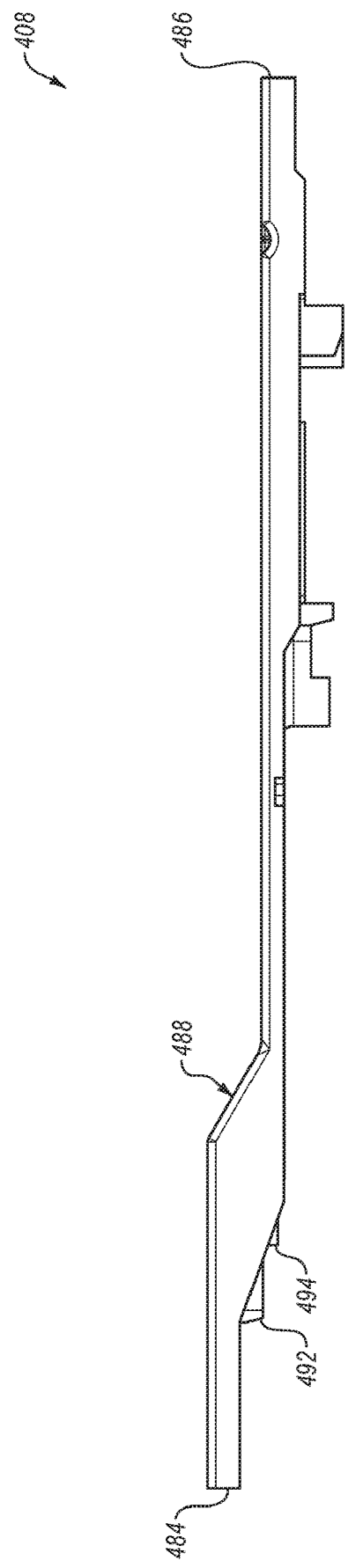
FIG. 26 is a side view of a first portion of the housing of the optoelectronic module of FIG. 19.
Figure 27:
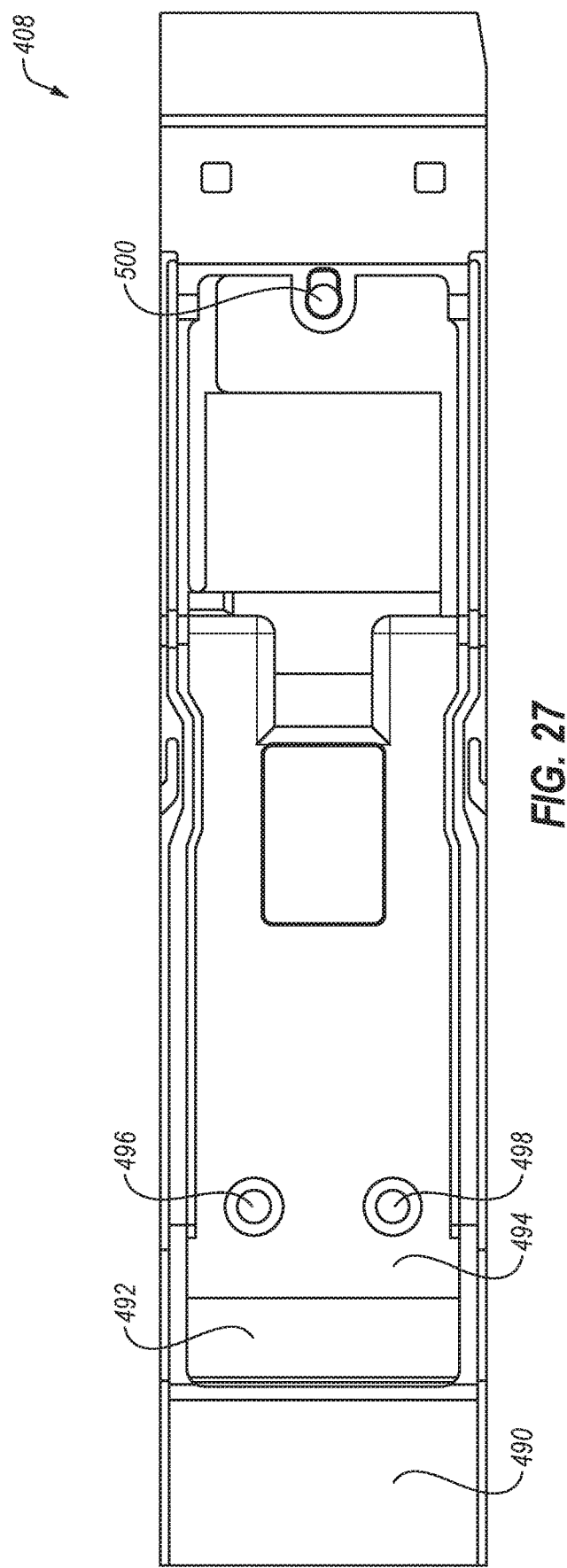
FIG. 27 is a bottom view of a first portion of the housing of the optoelectronic module of FIG. 19.

First portion 408 of housing 402 is shown in greater detail in FIGS. 26-27. First portion 408 extends between a first end 484 and an opposite second end 486. A ramped or angled portion 488 is positioned between first end 484 and second end 486 such that first end 484 and second end 486 are offset from one another. On its side facing second portion 410 of housing 402, first portion 408 includes portions 492, 494 and 496 which are offset from one another. More particularly, in the orientation of first portion 408 relative to second portion 410 shown in FIG. 19 for example, portion 192 is offset toward second portion 410 of housing 402 relative to portion 190, and portion 194 is offset toward second portion 410 of housing 402 relative to portion 492.

First portion 408 also includes apertures 496, 498 and 500 configured to receive fasteners 142, 144 and 146. As best seen in FIG. 19 for example, a surface of first portion 408 of housing 402 may be countersunk around apertures 496, 498 and 500 so that fasteners 142, 144 and 146 may be positioned flush with or below the surface of first portion 408.

PCB 112 and receptacles 118 may be positioned relative to second portion 410 of housing 402 in a manner similar to that described above with respect to housing 102. Moreover, biasing member 150, plate 270 and receiving member 140 may be engaged with second portion 410 by positioning these components through an opening at end 453 defined by sidewalls 452 and 454, top portion 457, and bottom portion 459. For example, biasing member 150 may be positioned through this opening and adjacent to partition 466, and receiving member 140 and plate 270 may be positioned through this opening and into engagement with biasing member 150. Plate 270 may be engaged with receiving member 140 in the arrangement illustrated in FIG. 12 before these components are positioned in the opening of second portion 410 of housing 402.

Figure 28:
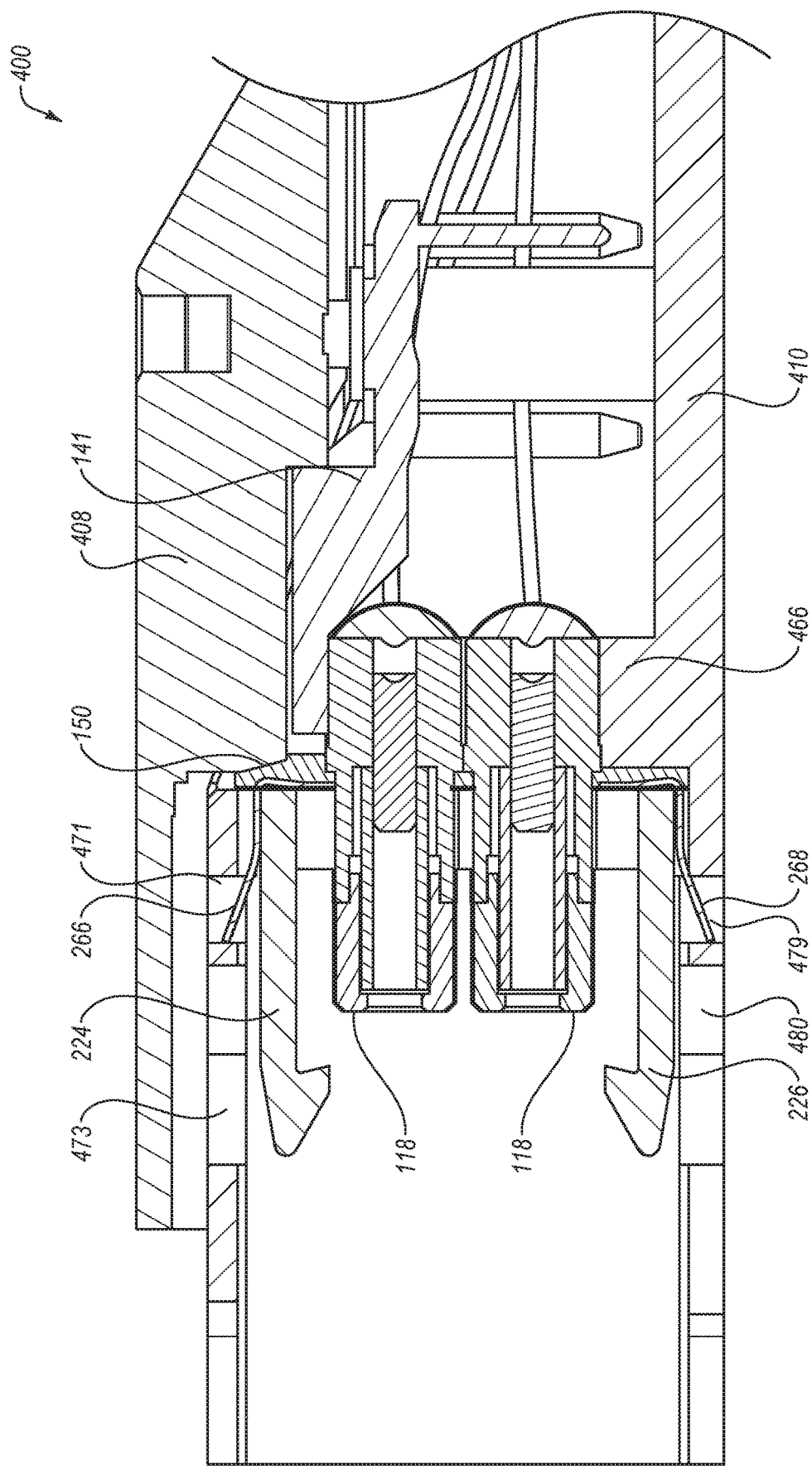
FIG. 28 is a cross-sectional view of a portion of the optoelectronic module of FIG. 19.

As best seen in FIG. 28, where a cross-sectional view of a portion of optoelectronic module 400 is illustrated, retaining members 266 are positioned in apertures 471 of second portion 410 of housing 402, and retaining members 268 are positioned in apertures 479 of second portion 410 of housing 402. More specifically, as receiving member 140 is positioned in second portion 410, top portion 457 and bottom portion 459 deflect retaining members 266, 268 toward one another to facilitate movement of receiving member 140 toward partition 466. In this arrangement, retaining members 266 and 268 engage with a surface of apertures 471, 479 facing toward partition 466 as biasing member 150 applies a force on receiving member 140 in the direction of first end 140. This engagement prevents movement of receiving member 140 toward first end 404 of optoelectronic module 400. When receiving member 140 is positioned in this fashion, a portion of each of engagement members 224 is aligned with a respective one of openings 473 and a portion of each of engagement members 226 is aligned with a respective one of openings 480. In this arrangement, openings 473 and 480 allow deflection of engagement members 224 and engagement members 226 away from one another as receiving member 140 is engaged by connector 1302 of fiber optic cable 1300. Once connector 1302 has been sufficiently positioned in receiving member 140, end portion 234 is received in receptacle 1312 of connector 1302, end portion 252 is received in receptacle 1314 of connector 1302, and engagement members 224 and engagement members 226 return to the position illustrated in FIG. 28. As also illustrated in FIG. 28, receptacle retaining member 141 engages with receptacles 118 in order to limit or prevent movement of receptacles 118 in optoelectronics module 400.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module for use with a plurality of fiber optic cables, each of the fiber optic cables including one or more optical fibers and including an end receptacle on a distal end thereof, the module comprising:

a housing extending along a longitudinal axis between a first end and an opposite second end, the first end configured to interface with the plurality of fiber optic cables, the first end of the housing having a partition surface facing in a first direction along the longitudinal axis toward the first end, the first end of the housing having housing surfaces facing in a second direction along the longitudinal axis toward the second end;

a printed circuit board ("PCB") positioned within the housing;

a transmitter positioned inside of the housing and electrically coupled to the PCB;

a receiver positioned inside of the housing and electrically coupled to the PCB;

a receiving member disposed in the first end of the housing and supported in the second direction by the partition surface, the receiving member including a plurality of ports, each of the ports being configured to receive the distal end of a respective one of the plurality of the fiber optic cables;

a plurality of deformable retaining members disposed on the receiving member, the deformable retaining members configured to be positioned against the housing surfaces of the housing in an arrangement structured to limit movement of the receiving member in the first direction along the longitudinal axis toward the first end away from the housing; and a plurality of deformable engagement members disposed on the receiving member and being configured to engage the end receptacles on the distal ends of the fiber optic cables.

2. The optoelectronic module of claim 1, further comprising a biasing member positioned between the partition surface of the housing and the receiving member, the biasing member being configured to bias the receiving member in the first direction toward the first end of the housing and being configured to maintain the deformable retaining members in engagement with the housing surfaces of the housing.

3. The optoelectronic module of claim 2, wherein the biasing member is formed of a material having electromagnetic interference (EMI) attenuating properties.

4. The optoelectronic module of claim 1, further comprising a plurality of optical receptacles disposed in a plurality of spaced apart openings in the partition surface, each of the optical receptacles extending in the ports of the receiving member and each optically coupled with one of the transmitter and the receiver, each of the optical receptacles structured to receive a portion of a respective one of the plurality of fiber optic cables.

5. The optoelectronic module of claim 4, wherein:
the housing further includes a partition having the partition surface and having the plurality of spaced apart openings;
one or more of the optical receptacles is positioned in a number of the spaced apart openings; and
each of the one or more optical receptacles positioned in the number of the openings includes a flange portion positioned between the partition surface and the receiving member in an arrangement that prevents movement of the one or more optical receptacles in the first and second directions along the longitudinal axis.

6. The optoelectronic module of claim 1,
wherein the housing surfaces of the housing are defined by a plurality of apertures positioned on opposite sides of the housing, and the deformable retaining members each include a portion configured to be positioned in a respective one of the apertures; or
wherein the housing surfaces of the housing are defined by a plurality of tabs positioned on one inner side of the housing and a shoulder of an elongated slot on another inner side of the housing, first of the deformable retaining members each include a portion configured to be positioned against a respective one of the tabs, and second of the deformable retaining members each include a portion configured to be positioned against the shoulder of the elongated slot.

7. An optoelectronic module for use with a plurality of fiber optic cables including one or more optical fibers, the module comprising:
a housing extending along a longitudinal axis between a first end and an opposite second end, the first end configured to interface with the plurality of fiber optic cables, the first end of the housing having a partition surface facing in a first direction along the longitudinal axis toward the first end, the first end of the housing having housing surfaces facing in a second direction along the longitudinal axis toward the second end;
a printed circuit board ("PCB") positioned within the housing;
a transmitter positioned inside of the housing and electrically coupled to the PCB;

a receiver positioned inside of the housing and electrically coupled to the PCB;
a receiving member disposed in the first end of the housing and supported in the second direction by the partition surface, the receiving member including a plurality of ports, each of the ports being configured to receive a respective one of the plurality of the fiber optic cables; and
a number of retaining members positioned between and engaging with the receiving member and the housing surfaces of the housing in an arrangement preventing movement of the receiving member in the first direction along the longitudinal axis toward the first end away from the housing.

8. The optoelectronic module of claim 7, wherein the receiving member further includes a pair of oppositely positioned recessed portions; and wherein the housing further includes a pair of oppositely positioned recessed portions having first of the housing surfaces cooperating with the recessed portions of the receiving member to define a pair of receptacles, and wherein one of the retaining members is positioned in each of the receptacles.

9. The optoelectronic module of claim 7, further comprising a biasing member positioned between the partition surface of the housing and the receiving member, the biasing member applying a force to the receiving member in the first direction toward the first end of the housing.

10. The optoelectronic module of claim 9, wherein the biasing member is formed of a material having electromagnetic interference (EMI) attenuating properties.

11. The optoelectronic module of claim 7, wherein the the retaining members include a plurality of deformable retaining members disposed on the receiving member and configured to be positioned against second of the housing surfaces of the housing in an arrangement structured to limit movement of the receiving member in the first direction along the longitudinal axis away from the housing.

12. The optoelectronic module of claim 7, the module comprising:
a plurality of optical receptacles disposed in a plurality of spaced apart openings in the partition surface, each of the optical receptacles extending in the ports and each optically coupled with one of the transmitter and the receiver, each of the optical receptacles structured to receive a portion of a respective one of the plurality of fiber optic cables; and
a receptacle retaining member positioned between the housing and the optical receptacles, wherein the receptacle retaining member engages against a number of the optical receptacles to limit movement of the optical receptacles in the housing.

13. The optoelectronic module of claim 12, wherein the housing includes a first portion cooperating with a second portion, and one or more fasteners extend through the first portion and the receptacle retaining member and engage with the second portion to couple the first portion with the second portion.

14. The optoelectronic module of claim 12, wherein the housing includes a first portion cooperating with a second portion, the receptacle retaining member includes one or more guides extending toward the first portion of the housing, and the one or more guides internally route a number of optical fibers optically coupling each optical receptacle with the receiver or transmitter.

15. The optoelectronic module of claim 14, wherein a number of the guides are engaged with a portion of the PCB.

16. The optoelectronic module of claim 12, wherein the housing includes a first portion cooperating with a second portion, the second portion includes a partition extending toward the first portion, the partition having the partition surface and including a number of spaced apart openings, and one or more of the optical receptacles is positioned in a number of the spaced apart openings.

17. The optoelectronic module of claim 16, wherein a portion of the receptacle retaining member is positioned above the partition and engages with the number of the optical receptacles in an arrangement clamping the optical receptacles between the receptacle retaining member and the second portion of the housing.

18. The optoelectronic module of claim 1, wherein the receiving member comprises a plate disposed on the receiving member and having the deformable retaining members, the plate having a plurality of apertures engaged with tabs disposed on the receiving member.

19. The optoelectronic module of claim 8, wherein the retaining members positioned in the pair of receptacles comprise pins inserted in the pair of receptacles.

20. The optoelectronic module of claim 11, wherein the second of the housing surfaces of the housing are defined by a plurality of apertures positioned on opposite sides of the housing, and the deformable retaining members each include a portion configured to be positioned in a respective one of the apertures; or wherein the second of the housing surfaces of the housing are defined by a plurality of tabs positioned on one inner side of the housing and a shoulder of an elongated slot on another inner side of the housing, first of the deformable retaining members each include a portion configured to be positioned against a respective one of the tabs, and second of the deformable retaining members each include a portion configured to be positioned against the shoulder of the elongated slot.

21. The optoelectronic module of claim 4, further comprising a receptacle retaining member positioned between the housing and the optical receptacles, wherein the receptacle retaining member engages against a number of the optical receptacles to limit movement of the optical receptacles in the housing.

22. The optoelectronic module of claim 7, each of the fiber optic cables including one or more optical fibers and including an end receptacle on a distal end thereof, wherein the module comprises a plurality of deformable engagement members disposed on the receiving member and being configured to engage the end receptacles on the distal ends of the fiber optic cables.

* * * * *